(12) United States Patent
Shi et al.

(10) Patent No.: US 11,910,218 B2
(45) Date of Patent: Feb. 20, 2024

(54) BEAM REPORTING METHOD AND COMMUNICATIONS APPARATUS

(71) Applicant: HUAWEI TECHNOLOGIES CO., LTD., Guangdong (CN)

(72) Inventors: Hongzhe Shi, Shanghai (CN); Shibin Ge, Shanghai (CN); Xiaoyan Bi, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 462 days.

(21) Appl. No.: 17/324,712

(22) Filed: May 19, 2021

(65) Prior Publication Data
US 2021/0274372 A1 Sep. 2, 2021

Related U.S. Application Data

(63) Continuation of application No. PCT/CN2019/119186, filed on Nov. 18, 2019.

(30) Foreign Application Priority Data

Nov. 19, 2018 (CN) .......................... 201811378725.9

(51) Int. Cl.
*H04W 24/10* (2009.01)
*H04W 72/044* (2023.01)
(Continued)

(52) U.S. Cl.
CPC ........... *H04W 24/10* (2013.01); *H04L 5/0048* (2013.01); *H04W 72/046* (2013.01); *H04W 72/23* (2023.01)

(58) Field of Classification Search
CPC ... H04W 24/10; H04W 72/046; H04W 72/23; H04L 5/0048; H04L 5/0035;
(Continued)

(56) References Cited

U.S. PATENT DOCUMENTS 10,425,139 B2 * 9/2019 Guo .................. H04B 7/088
10,567,058 B2 * 2/2020 Guo .................. H04W 24/10
(Continued)

FOREIGN PATENT DOCUMENTS

CN 102036249 A 4/2011
CN 104521294 A 4/2015
(Continued)

OTHER PUBLICATIONS

ZTE et al., "Summary for AI 7.1.6.1 NR UL power control in non-CA aspects," 3GPP TSG RAN WG1 Meeting #92bis R1-1805553, Sanya, China, Apr. 16-20, 2018, 27 pages.
(Continued)

*Primary Examiner* — Ahmed Elallam
(74) *Attorney, Agent, or Firm* — Fish & Richardson P.C.

(57) ABSTRACT

A beam reporting method and a communications apparatus is provided. The method includes that a terminal device receives first information, where the first information is used to configure at least two reference signal resource groups; and sending, by the terminal device, reporting information, where the reporting information includes related information of at least two beams, the at least two beams are used to send reference signals carried on at least two reference signal resources, and the reference signals sent by using the at least two beams can be simultaneously received by the terminal device, where the at least two reference signal resources are respectively from the at least two reference signal resource groups. In this application, related information of beams of at least two transmission points is reported through one time of beam scanning, to implement beam training in a CoMP system.

20 Claims, 6 Drawing Sheets

(51) Int. Cl.
*H04W 72/23* (2023.01)
*H04L 5/00* (2006.01)
*H04B 7/06* (2006.01)

(58) Field of Classification Search
CPC ... H04L 5/0023; H04L 5/0053; H04L 5/0094; H04B 7/024; H04B 7/063; H04B 7/0695; H04B 7/088
See application file for complete search history.

(56) References Cited

U.S. PATENT DOCUMENTS

| | | | | |
|---|---|---|---|---|
| 11,139,878 | B2* | 10/2021 | Wang | H04B 7/0404 |
| 11,303,408 | B2* | 4/2022 | Liu | H04B 7/0695 |
| 11,477,838 | B2* | 10/2022 | Chen | H04B 7/0695 |
| 11,497,030 | B2* | 11/2022 | Liu | H04L 5/0051 |
| 11,522,596 | B2* | 12/2022 | Ling | H04B 7/0691 |
| 11,601,178 | B2* | 3/2023 | Zhang | H04B 7/088 |
| 11,653,238 | B2* | 5/2023 | Qin | H04W 72/046 370/329 |
| 11,689,938 | B2* | 6/2023 | Franke | H04W 72/23 375/262 |
| 11,764,929 | B2* | 9/2023 | Gao | H04L 5/005 370/328 |
| 2018/0227031 | A1 | 8/2018 | Guo et al. | |
| 2022/0174712 | A1* | 6/2022 | Zhang | H04L 5/0094 |

FOREIGN PATENT DOCUMENTS

| | | |
|---|---|---|
| CN | 105704830 A | 6/2016 |
| CN | 108111278 A | 6/2018 |
| CN | 108243430 A | 7/2018 |
| CN | 108282321 A | 7/2018 |
| CN | 108288991 A | 7/2018 |
| CN | 108632836 A | 10/2018 |
| CN | 108667496 A | 10/2018 |
| CN | 108668370 A | 10/2018 |
| CN | 108696346 A | 10/2018 |
| CN | 108696889 A | 10/2018 |
| CN | 108702226 A | 10/2018 |
| WO | 2017083489 A1 | 5/2017 |
| WO | 2018072699 A1 | 4/2018 |

OTHER PUBLICATIONS

3gpp TS 38.214 V15.3.0 (Sep. 2018), "3rd Generation Partnership Project; Technical Specification Group Radio Access Network; NR; Physical layer procedures for data (Release 15)," Sep. 2018, 96 pages.
PCT International Search Report and Written Opinion in International Application No. PCT/CN2019/119186, dated Feb. 21, 2020, 13 pages.
Extended European Search Report issued in European Application No. 19886710.3 dated Oct. 20, 2021, 8 pages.
Office Action issued in Chinese Application No. 201811378725.9 dated Nov. 22, 2021, 19 pages (with English translation).
Vivo, "Discussion on beam measurement, beam reporting and beam indication," 3GPP TSG RAN WG1 Meeting #90bis, R1-1717472, Prague, Czech Republic, Oct. 9-13, 2017, 12 pages.
Office Action issued in Chinese Application No. 201811378725.9 dated Jun. 27, 2022, 7 pages.
Office Action issued in Chinese Application No. 201811378725.9 dated Apr. 2, 2022, 8 pages.

* cited by examiner

BEAM REPORTING METHOD AND COMMUNICATIONS APPARATUS

CROSS-REFERENCE TO RELATED APPLICATIONS

This application is a continuation of International Application No. PCT/CN2019/119186, filed on Nov. 18, 2019, which claims priority to Chinese Patent Application No. 201811378725.9, filed on Nov. 19, 2018. The disclosures of the aforementioned applications are hereby incorporated by reference in their entireties.

TECHNICAL FIELD

This application relates to the communications field, and in particular, to a beam reporting method and a communications apparatus.

BACKGROUND

In a future communications system, for example, in a fifth generation mobile communications (5th-Generation, 5G) system, only low frequency communication in a frequency band lower than 6 GHz cannot meet an increasing communication requirement. Therefore, high frequency (high frequency, HF) communication in a frequency greater than 6 GHz is increasingly valued by academia and the industry. However, due to fast energy attenuation and a weak penetration capability of HF signals in space, a path loss of the HF signals is much greater than that of low frequency signals. Therefore, to resist the path loss in a high frequency scenario, a gain on an antenna side needs to be used to compensate for the loss, to ensure coverage of an HF system. In addition, because of a shorter signal wavelength and a smaller antenna size in the HF scenario, a massive-MIMO (Massive-MIMO) technology is more suitable for applications in the HF scenario. Based on the massive-MIMO technology, a transmit beam with more concentrated energy may be formed on a transmit side such as a network device side in a digital and analog manner to ensure system coverage, and a receive beam with more concentrated energy may also be formed on a receive side such as a terminal device side to increase a receive gain.

In the HF system, both the receive side and the transmit side tend to use a narrow beam for communication. Therefore, mutual matching of narrow beams is particularly important. The network device and the terminal device may obtain a pairing relationship between the transmit beam and the receive beam through beam (beam) training.

In coordinated multipoint (coordination multiple point, CoMP) as a transmission technology that is applicable to improving a throughput of a user at a cell edge, one terminal device may simultaneously communicate with a plurality of transmission reception points (transmission and reception point, TRP). Based on an existing beam training manner, in a CoMP system, beams reported by the terminal device may be from a same TRP. Consequently, the terminal device cannot perform beam training with the plurality of TRPs that simultaneously communicate with the terminal device.

Therefore, how to perform beam training in the CoMP system becomes an urgent problem to be resolved.

SUMMARY

This application provides a beam reporting method and a communications apparatus, to implement beam training in a CoMP system.

According to a first aspect, a beam reporting method is provided. The method includes: A terminal device receives first information, where the first information is used to configure at least two reference signal resource groups; and the terminal device sends reporting information, where the reporting information includes related information of at least two beams, the at least two beams are used to send reference signals carried on at least two reference signal resources, and the reference signals sent by using the at least two beams can be simultaneously received by the terminal device, where the at least two reference signal resources are respectively from the at least two reference signal resource groups.

According to a second aspect, a beam reporting method is provided. The method includes:

A network device sends first information, where the first information is used to configure at least two reference signal resource groups; and the network device receives reporting information sent by a terminal device, where the reporting information includes related information of at least two beams, the at least two beams are used to send reference signals carried on at least two reference signal resources, and the reference signals sent by using the at least two beams can be simultaneously received by the terminal device, where the at least two reference signal resources are respectively from the at least two reference signal resource groups.

Specifically, in the embodiments of this application, reference signal resources are grouped. For example, one reference signal resource group may correspond to one network device in joint transmission. The terminal device selects to-be-reported beams from different transmit beam resource groups, and the beams reported by the terminal device can be simultaneously received by the terminal device. In other words, in the embodiments of this application, related information of at least one beam is reported for each reference signal resource group, so that a transmit beam of a network device corresponding to the reference signal resource group can be trained. Therefore, in the embodiments of this application, downlink beams of a plurality of network devices in joint transmission can be trained through one time of scanning.

It should be understood that in the embodiments of this application, a quantity of the at least two reference signal resources may be equal to a quantity of the at least two reference signal resource groups. In this case, the at least two reference signal resources include one reference signal resource in each reference signal resource group. In other words, for each reference signal resource group, the terminal device reports related information of a beam corresponding to the one reference signal resource.

Optionally, a quantity of the at least two reference signal resources may be greater than a quantity of the at least two reference signal resource groups. In this case, the at least two reference signal resources include one or more reference signal resources in each reference signal resource group. In other words, for each reference signal resource group, the terminal device reports related information of a beam corresponding to the one or more reference signal resources.

It should be noted that, in the embodiments of this application, the terminal device has a capability of simultaneously receiving the reference signals sent by using the at least two beams. During actual application, the network device may simultaneously send the reference signals by using the at least two beams, or may sequentially send the reference signals. In other words, the terminal device may simultaneously receive the reference signals sent by using the at least two beams, or may sequentially receive the reference signals sent by using the at least two beams, and the terminal device may receive, by using a same receive beam, the reference signals sent by using the at least two beams, or may receive, by using at least two receive beams that may simultaneously exist, the reference signals sent by using the at least two beams. Specifically, how the terminal device determines that the terminal device has the foregoing capability is implemented by the terminal device. This is not limited in the embodiments of this application.

Optionally, in an implementation, the related information of the at least two beams in the embodiments of this application includes at least two reference signal received powers and at least two reference signal resource indicators that are in a one-to-one correspondence with the at least two reference signal received powers.

It should be understood that in the embodiments of this application, the related information of the beam may have a plurality of possible forms, provided that the related information of the beam can indicate the terminal device to select and report the at least two beams. The embodiments of this application are not limited to the reference signal received power and the reference signal resource indicator. For example, the related information of the at least two beams may alternatively be signal-to-noise ratios of the reference signals sent by using the at least two beams.

With reference to the first aspect or the second aspect, in a possible implementation, the first information is carried in one or more of the following signaling:

radio resource control RRC signaling, a media access control control element MAC-CE, and downlink control information DCI.

With reference to the first aspect or the second aspect, in a possible implementation, when the first information is carried in the RRC, the reference signal is sent in a periodic manner; or when the first information is carried in the MAC-CE, the reference signal is sent in a semi-persistent manner; or when the first instruction is carried in the DCI, the reference signal is sent in an aperiodic manner.

With reference to the first aspect or the second aspect, in a possible implementation, the reference signal resource group is a reference signal resource set, and the at least two reference signal resource groups are configured by directly configuring, activating, or triggering at least two reference signal resource sets based on the first information.

In the embodiments of this application, resource types (resource type) in a resource setting (resource setting) may be configured to three time domain periodic behaviors: periodic (periodic), semi-persistent (semi-persistent), and aperiodic (aperiodic). For the three periodic behaviors, the network device may directly configure, activate, or trigger the at least two reference signal resource sets to configure the at least two reference signal resources.

In the embodiments of this application, the network device directly configures, activates, or triggers a plurality of resource sets, to implement reference signal resource grouping, and reports related information of at least one beam for each resource, to train a beam of a network device corresponding to the resource.

With reference to the first aspect or the second aspect, in a possible implementation, the first information includes quasi co-location QCL configuration information of reference signal resources in a same reference signal resource set, and reference signal resources with same QCL configuration information are configured as a same reference signal resource group.

With reference to the first aspect or the second aspect, in a possible implementation, the QCL configuration information is a transmission configuration indicator TCI state identifier that is in a one-to-one correspondence with a reference signal resource.

In the embodiments of this application, the reference signal resources with the same QCL configuration information are configured as the same reference signal resource group, so that the at least two reference signal resource groups are configured. Because different network devices correspond to different reference signal resource groups, for each reference signal resource group, the terminal device reports related information of one or more beams corresponding to the terminal device. Therefore, in the embodiments of this application, downlink beams of a plurality of network devices in joint transmission are simultaneously trained.

With reference to the first aspect or the second aspect, in a possible implementation, the first information is resource setting information, and the resource setting information is used to configure the at least two reference signal resource groups by configuring identifier sequence numbers of reference signal resources in a same reference signal resource set.

In the embodiments of this application, reference signal resources whose reference signal resource sequence numbers meet a rule are grouped into a same reference signal resource group, so that the at least two reference signal resource groups are configured. Because different network devices correspond to different reference signal resource groups, for each reference signal resource group, the terminal device reports related information of one or more beams corresponding to the terminal device. Therefore, in the embodiments of this application, downlink beams of a plurality of network devices in joint transmission are simultaneously trained.

With reference to the first aspect, in a possible implementation, before the terminal device sends the reporting information, the method further includes:

The terminal device receives indication information sent by the network device, where the indication information is used to indicate that a multi-beam grouping-based reporting mode is in an on state, and that the multi-beam grouping-based reporting mode is in the on state indicates that the terminal device needs to report the related information of the at least two beams.

With reference to the second aspect, in a possible implementation, before the network device receives the reporting information sent by the terminal device, the method further includes:

The network device sends the indication information to the terminal device, where the indication information is used to indicate that a multi-beam grouping-based reporting mode is in an on state, and that the multi-beam grouping-based reporting mode is in the on state indicates that the terminal device needs to report the related information of the at least two beams.

In the embodiments of this application, the terminal device sends the reporting information based on the foregoing multi-beam grouping-based reporting method only when a specific condition is met, so that the multi-beam grouping-based reporting method can be limited to a beam training scenario, thereby avoiding a case in which the reporting information is sent by using this method in another scenario.

According to a third aspect, a communications apparatus is provided. The communications apparatus includes modules or units configured to perform the method according to any one of the first aspect or the possible implementations of the first aspect.

In an implementation, the communications apparatus is a terminal device.

According to a fourth aspect, a communications apparatus is provided. The communications apparatus includes modules or units configured to perform the method according to any one of the second aspect or the possible implementations of the second aspect.

In an implementation, the communications apparatus is a network side device.

According to a fifth aspect, a communications apparatus is provided. The communications apparatus includes a transceiver, a processor, and a memory. The processor is configured to control the transceiver to receive and send a signal, the memory is configured to store a computer program, and the processor is configured to invoke the computer program in the memory and run the computer program, to enable the network device to perform the method according to the first aspect and the possible implementations of the first aspect.

In an implementation, the communications apparatus is a terminal device.

According to a sixth aspect, a communications apparatus is provided. The communications apparatus includes a transceiver, a processor, and a memory. The processor is configured to control the transceiver to receive and send a signal, the memory is configured to store a computer program, and the processor is configured to invoke the computer program in the memory and run the computer program, to enable the terminal device to perform the method according to the second aspect and the possible implementations of the second aspect.

In an implementation, the communications apparatus is a network device.

According to a seventh aspect, a computer-readable medium is provided. The computer-readable medium stores a computer program, and when the computer program is executed by a computer, the method according to the first aspect and the possible implementations of the first aspect is implemented.

According to an eighth aspect, a computer-readable medium is provided. The computer-readable medium stores a computer program, and when the computer program is executed by a computer, the method according to the second aspect and the possible implementations of the second aspect is implemented.

According to a ninth aspect, a computer program product is provided. When the computer program product is executed by a computer, the method according to the first aspect and the possible implementations of the first aspect is implemented.

According to a tenth aspect, a computer program product is provided. When the computer program product is executed by a computer, the method according to the second aspect and the possible implementations of the second aspect is implemented.

According to an eleventh aspect, a processing apparatus is provided. The processing apparatus includes a processor and an interface.

According to a twelfth aspect, a processing apparatus is provided. The processing apparatus includes a processor, an interface, and a memory.

In the eleventh aspect or the twelfth aspect, the processor is configured to perform the method according to any one of the first aspect and the second aspect or the possible implementations of the first aspect and the second aspect, where a related data exchange process (for example, sending or receiving data transmission) is completed through the interface. In a specific implementation process, the foregoing data exchange process may be further completed by using the transceiver through the interface.

It should be understood that the processing apparatus according to the eleventh aspect or the twelfth aspect may be a chip, and the processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor and exist independently.

According to a thirteenth aspect, a system is provided. The system includes the foregoing network device and terminal device.

DESCRIPTION OF EMBODIMENTS

The following describes the technical solutions in this application with reference to the accompanying drawings.

Embodiments of this application may be applied to various communications systems. Therefore, the following descriptions are not limited to a particular communications system. For example, the embodiments of this application may be applied to a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a worldwide interoperability for microwave access (worldwide interoperability for microwave access, WiMAX) communications system, and a future 5th generation (5th generation, 5G) system or new radio (new radio, NR) system.

Figure 1:
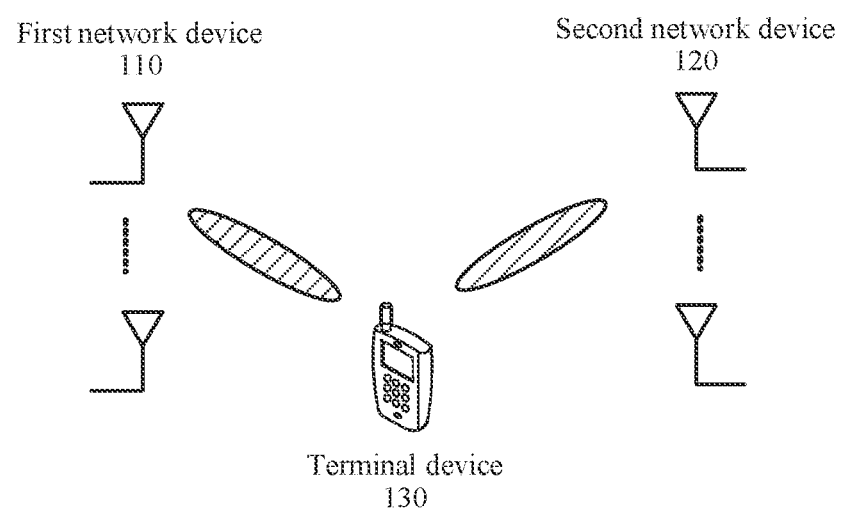
FIG. 1 is a schematic diagram of a scenario to which an embodiment of this application is applicable.

FIG. 1 is a schematic block diagram of a wireless communications system 100 to which an embodiment of this application is applicable. The wireless communications system 100 may include one or more network devices and one or more terminal devices. For example, as shown in FIG. 1, the wireless communications system 100 includes a first network device 110, a second network device 120, and one or more terminal devices 130 located within coverage of the first network device 110 and the second network device 120. The terminal device 130 may be mobile or static. Both the first network device 110 and the second network device 120 may communicate with the terminal device 130 through a radio air interface. The first network device 110 and the second network device 120 may provide communication coverage for a specific geographical area, and may communicate with a terminal device within the coverage area.

It should be understood that "first", "second", and the like in the embodiments of this application are merely used for differentiation, and impose no limitation on the embodiments of this application.

The first network device 110 or the second network device 120 may be a base transceiver station (base transceiver station, BTS) in a global system for mobile communications (global system for mobile communications, GSM) system or a code division multiple access (code division multiple access. CDMA) system, or may be a NodeB (NodeB, NB) in a wideband code division multiple access (wideband code division multiple access. WCDMA) system, or may be an evolved NodeB (evolved NodeB, eNB or eNodeB) in an LTE system, or may be a radio controller in a cloud radio access network (cloud radio access network, CRAN) scenario. Alternatively, the network device may be a relay node, an access point, a vehicle-mounted device, a wearable device, a network device in a future 5G network, a network device in a future evolved PLMN network, or the like, for example, a transmission reception point (transmission and reception point. TRP) or a transmission point (transmission point, TP) in an NR system, or a gNB (gNB) in an NR system, or one antenna panel or a group of antenna panels (including a plurality of antenna panels) of a base station in a 5G system. This is not particularly limited in the embodiments of this application.

The terminal device 130 may also be referred to as user equipment (User Equipment, UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a session initiation protocol (Session Initiation Protocol, SIP) phone, a wireless local loop (Wireless Local Loop, WLL) station, a personal digital assistant (Personal Digital Assistant. PDA), a handheld device having a wireless communication function, a computing device or another processing device connected to a wireless modem, a vehicle-mounted device, a wearable device, a smart household device, an unmanned aerial vehicle device, a terminal device in a future 5G network, or a terminal device in a future evolved public land mobile network (public land mobile network, PLMN). This is not limited in the embodiments of this application.

The wireless communications system 100 may support CoMP transmission (which may also be referred to as joint transmission), that is, at least two network devices (TRPs) transmit downlink data to a terminal device in a coordinated multipoint transmission manner. In other words, the terminal device 130 may communicate with the first network device 110, or may communicate with the second network device 120, and the coordinated multipoint transmission manner may be implemented by using a technology such as spatial diversity and/or spatial multiplexing. The first network device and the second network device may be on a same carrier, or may be on different carriers. This is not limited in this application.

The "coordinated multipoint transmission" in this application includes but is not limited to joint transmission JT. The JT includes coherent JT and non-coherent JT (NCJT). A difference between the coherent JT and the non-coherent JT (NCJT) lies in that in the NCJT, beamforming is separately performed on different MIMO data streams from a plurality of coordinated TRPs, and in the coherent JT, joint beamforming is performed on all MIMO data streams from a plurality of coordinated TRPs.

In the embodiments of this application, the first network device may be used as a serving network device, and the second network device may be a coordinated network device; or the first network device may be a coordinated network device, and the second network device is a serving network device; or both the first network device and the second network device may be serving network devices. This is not limited in the embodiments of this application.

In a scenario in which the coordinated multipoint transmission is applied, the serving network device may send control signaling to the terminal device, and the coordinated network device may send data to the terminal device; or the serving network device may send control signaling to the terminal device, and the serving network device and the coordinated network device may both send data to the terminal device; or the serving network device and the coordinated network device may both send control signaling to the terminal device, and the serving network device and the coordinated network device may both send data to the terminal device. This is not particularly limited in the embodiments of this application. Communication, for example, control message transfer, may be performed between the serving network device and the coordinated network device and between a plurality of coordinated network devices.

In a coordinated multipoint transmission mode, at least two TRPs communicate with the terminal device by using a beam that has a pairing relationship with the terminal device, for example, the at least two TRPs send downlink data to the terminal device by using a downlink beam that is paired with the terminal device. Specifically, the two TRPs need to determine, through beam scanning (or referred to as beam training), the downlink beam used to communicate with the terminal device.

The following describes some concepts in the embodiments of this application.

A "beam" may be understood as a spatial filter (spatial filter) or a spatial parameter (spatial parameters). A beam used for sending a signal may be referred to as a transmit beam (transmission beam, Tx beam), or may be referred to as a spatial transmit filter (spatial domain transmit filter) or a spatial transmit parameter (spatial domain transmit parameter). A beam used for receiving a signal may be referred to as a receive beam (reception beam, Rx beam), or may be referred to as a spatial receive filter (spatial domain receive filter) or a spatial receive parameter (spatial domain receive parameter).

A technology for forming a beam may be a beamforming technology or another technology. For example, the beamforming technology may be specifically a digital beamforming technology, an analog beamforming technology, or a hybrid digital/analog beamforming technology. The transmit beam may refer to distribution of signal strength formed in different directions in space after a signal is transmitted through an antenna, and the receive beam may refer to distribution of signal strength that is of a radio signal received through an antenna and that is in different directions in space.

In an NR protocol, the beam may be, for example, a spatial filter (spatial filter). However, it should be understood that this application does not exclude a possibility that another term is defined in a future protocol to represent a same or similar meaning.

It should be noted that, in the embodiments shown below, the "beam" and the "spatial filter" are used interchangeably. For example, the "transmit beam" and the "spatial transmit filter" are used interchangeably, and the "receive beam" and the "spatial receive filter" are used interchangeably. When a difference between the terms is not emphasized, meanings to be expressed are consistent.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like. Different beams may be considered as different resources. Same information or different information may be sent by using different beams.

It should be understood that the foregoing enumerated embodying of the beam in the NR protocol is merely an example, and shall not constitute any limitation on this application. This application does not exclude a possibility that another term is defined in a future protocol to represent a same or similar meaning.

A "beam pairing relationship" is a pairing relationship between a transmit beam and a receive beam, that is, a pairing relationship between a spatial transmit filter and a spatial receive filter. A relatively large beamforming gain can be obtained by transmitting a signal between a transmit beam and a receive beam that have a beam pairing relationship.

In an implementation, a transmit end and a receive end may obtain a beam pairing relationship through beam training. Specifically, the transmit end may send a reference signal in a beam scanning manner, and the receive end may also receive a reference signal in the beam scanning manner. Specifically, the transmit end may form different directional beams in space through beamforming, and may perform polling on a plurality of different directional beams, to transmit a reference signal by using the different directional beams, so that a power of transmitting the reference signal can reach a maximum value in a direction directed by a transmit beam. The receive end may also form different directional beams in space through beamforming, and may perform polling on a plurality of different directional beams, to receive a reference signal by using the different directional beams, so that a power for receiving the reference signal by the receive end can reach a maximum value in a direction directed by a receive beam.

The receive end may perform channel measurement based on the received reference signal by traversing each transmit beam and each receive beam, and report a result obtained through measurement to the transmit end by using channel state information (channel state information, CSI). For example, the receive end may report some reference signal resources with relatively high reference signal received powers (reference signal receiving power, RSRP) to the transmit end, for example, report an indicator of a reference signal resource, or report an indicator of a reference signal resource and an RSRP corresponding to the reference signal resource. Therefore, when transmitting data or signaling, the transmit end receives and sends a signal based on a beam pairing relationship with relatively good channel quality.

"Reference signal and reference signal resource": The reference signal may be used for channel measurement, channel estimation, or the like. The reference signal resource may be used to configure a transmission attribute of the reference signal, for example, a time-frequency resource location, a port mapping relationship, a power factor, and a scrambling code. For details, refer to the conventional technology. A transmit end device may send the reference signal based on the reference signal resource, and a receive end device may receive the reference signal based on the reference signal resource.

The channel measurement in this application further includes beam measurement. To be specific, beam quality information is obtained by measuring a reference signal. A parameter used to measure beam quality includes an RSRP, but is not limited thereto. For example, beam quality may also be measured by using parameters such as reference signal received quality (reference signal receiving quality, RSRQ), a signal-to-noise ratio (signal-noise ratio, SNR), and signal to interference plus noise ratio (signal to interference plus noise ratio, SINR, signal to interference plus noise ratio for short). In the embodiments of this application, for ease of description, unless otherwise specified, the channel measurement may be considered as the beam measurement.

The reference signal may include, for example, a channel state information reference signal (channel state information reference signal, CSI-RS), a synchronization signal block (synchronization signal block, SSB), and a sounding reference signal (sounding reference signal, SRS). Correspondingly, the reference signal resource may include a CSI-RS resource (CSI-RS resource), an SSB resource, and an SRS resource (SRS resource).

It should be noted that the foregoing SSB may also be referred to as a synchronization signal/physical broadcast channel block (synchronization signal/physical broadcast channel block. SS/PBCH block), and the corresponding SSB resource may also be referred to as a synchronization signal/physical broadcast channel block resource (SS/PBCH block resource) that may be referred to as an SSB resource for short.

To distinguish between different reference signal resources, each reference signal resource may correspond to one reference signal resource indicator, for example, a CSI-RS resource indicator (CSI-RS resource indicator, CRI), an SSB resource indicator (SSB resource indicator, SSBRI), or an SRS resource index (SRS resource index. SRI).

The SSB resource indicator may also be referred to as an SSB index (SSB index).

It should be understood that the reference signals and the corresponding reference signal resources enumerated above are merely examples for description, and shall not constitute any limitation on this application. This application does not exclude a possibility that another reference signal is defined in a future protocol to implement a same or similar function.

"Reporting setting (reporting setting)": The reporting setting may also be referred to as a channel state information CSI reporting setting, and may be associated with one or more resource settings (resource setting). For example, the reference signal resource is a CSI-RS resource. When the reference signal resource is used for beam measurement, a reporting parameter (ReportQuantity) in the reporting setting may be set to "CRI+RSRP". In other words, beam quality or strength is measured by using an RSRP, and a reporting configuration type (ReportConfigureType) may be used. A configured periodic reporting behavior includes aperiodic reporting (aperiodic), periodic reporting (periodic), or semi-persistent reporting (semi-persistent). For example, a reporting behavior of beam quality or strength shown in FIG. 2 is aperiodic reporting.

"Resource setting (resource setting)": The resource setting is associated with one or more reference signal resource sets (resource set), and a resource type (resource type) is configured to an aperiodic resource (aperiodic), a periodic resource (periodic), or a semi-persistent resource (semi-persistent). One resource set may include one or more reference signal resources. Specifically, the reference signal resource may be used to configure a transmission attribute of a reference signal, for example, a time-frequency resource location, a port mapping relationship, a power factor, and a scrambling code.

Figure 2:
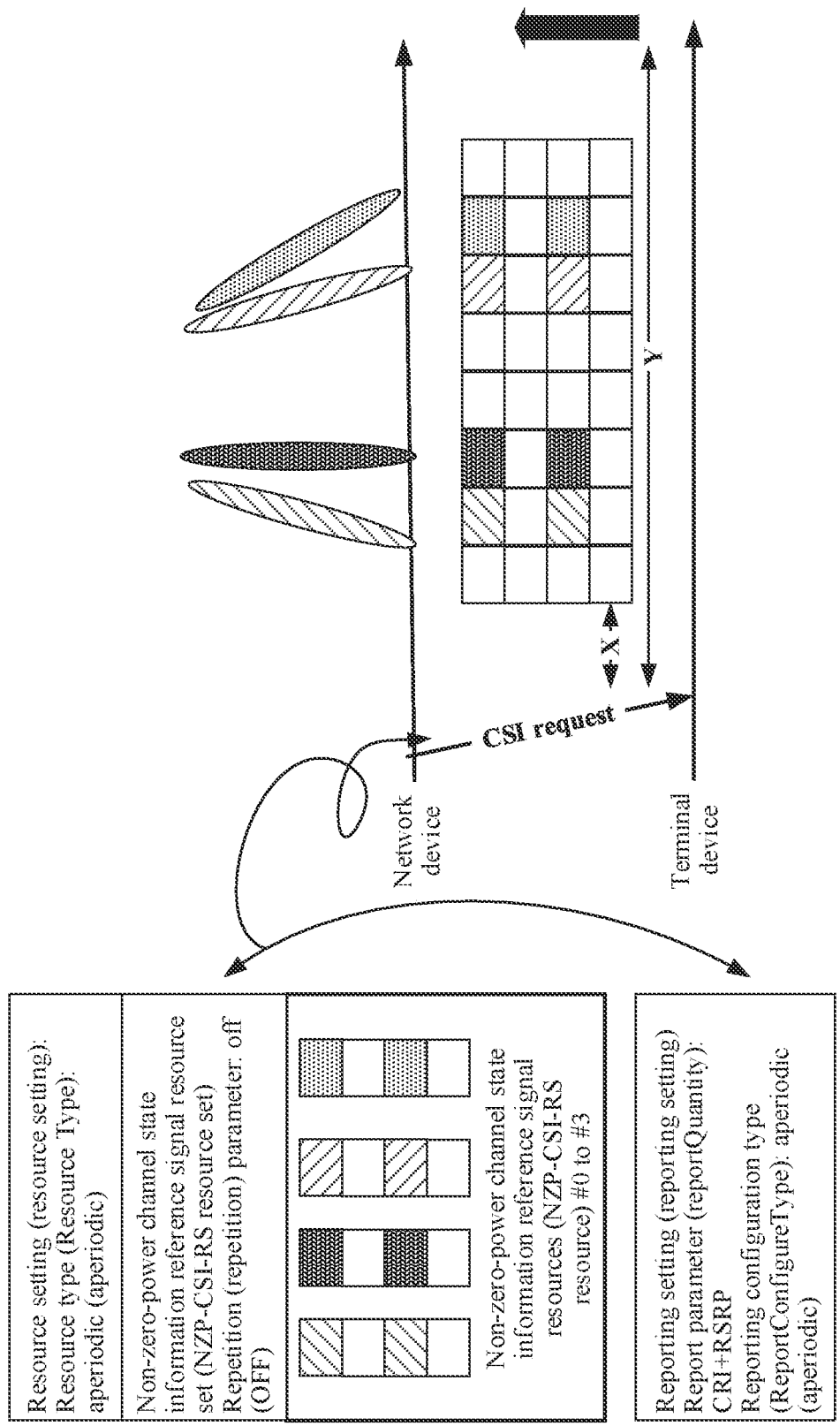
FIG. 2 is a schematic diagram of a beam scanning-related configuration according to an embodiment of this application.

For example, as shown in FIG. 2, a resource set associated with a resource setting (resource setting) may be a non-zero-power channel state information reference signal resource set (NZP-CSI-RS resource set), and a resource type is an aperiodic resource. The NZP-CSI-RS resource set may include one or more NZP-CSI-RS resources. For example, as shown in FIG. 2, four NZP-CSI-RS resources are included, and the resources have respective resource sequence numbers (#0 to #3). Each NZP-CSI-RS resource is carried on one beam when being sent, and the terminal device may measure an RSRP of a CSI-RS transmitted on the NZP-CSI-RS resource to compare beam quality.

It should be understood that, in the embodiments of this application, the resource set (resource set) associated with the resource setting (resource setting) may be a set of zero-power or non-zero-power reference signal resources. The embodiments of this application are not limited thereto. It should be understood that, the "resource setting (resource setting)" being associated with the resource set (resource set) may indicate that the resource setting is used to configure the resource set, or that the resource setting includes the resource set. This is not limited in the embodiments of this application. It should be understood that the "resource set" in this embodiment of this application may also be referred to as a "resource collection".

It should be understood that the "resource setting" described above is applicable to a case in which the reference signal resource is a CSI-RS. However, the reference signal resource in the embodiments of this application is not limited to the CSI-RS. For example, the reference signal resource in the embodiments of this application may alternatively be an SSB or an SRS. Specifically, for a resource association relationship of the SSB or the SRS, refer to the conventional technology. Details are not described herein.

It should be noted that, as shown in FIG. 2, when a repetition parameter (repetition) is set to ON, it indicates that transmit beams carrying the four NZP-CSI-RS resources are repeated; when the repetition parameter (repetition) is set to OFF, it indicates that there is no limitation (repetition or non-repetition).

If the NZP-CSI-RS resource set is periodic, when receiving an RRC configuration message, the terminal device starts receiving and measurement at a corresponding time-frequency location based on a specific CSI-RS resource setting. If the NZP-CSI-RS resource set is semi-persistent, the terminal device starts receiving and measurement only after receiving a related MAC-CE activation instruction, and stops measurement after receiving a deactivation instruction. If the NZP-CSI-RS resource set is aperiodic, the terminal device starts receiving and measurement only after receiving one DCI trigger instruction, and the measurement is performed only once.

It should be understood that the reporting setting and the resource setting may be sent by the network device by using higher layer signaling, for example, RRC signaling. This is not limited in the embodiments of this application.

"Antenna port (antenna port)": The antenna port is referred to as a port for short. The port is a transmit antenna identified by a receive end device or a transmit antenna that can be distinguished in space. One antenna port may be configured for each virtual antenna, the virtual antenna may be a weighted combination of a plurality of physical antennas, and each antenna port may correspond to one reference signal port.

"Quasi-co-location (quasi-co-location, QCL)": The quasi-co-location is also referred to as quasi-colocation. Signals corresponding to antenna ports that have a QCL relationship have a same parameter, a parameter of an antenna port may be used to determine a parameter of another antenna port that has a QCL relationship with the antenna port, two antenna ports have a same parameter, or a parameter difference between two antenna ports is less than a threshold. The parameter may include one or more of the following: a delay spread (delay spread), a Doppler spread (Doppler spread), a Doppler shift (Doppler shift), an average delay (average delay), an average gain, and a spatial receive parameter (spatial Rx parameters). The spatial receive parameter may include one or more of the following: an angle of arrival (angle of arrival, AOA), an average AOA, an AOA spread, an angle of departure (angle of departure, AOD), an average angle of departure AOD, an AOD spread, a receive antenna spatial correlation parameter, a transmit antenna spatial correlation parameter, a transmit beam, a receive beam, and a resource indicator.

The foregoing angles may be decomposition values at different dimensions or a combination of decomposition values at different dimensions. The antenna ports are antenna ports having different antenna port numbers, and/or antenna ports that have a same antenna port number and that are used to send or receive information at different time, and/or on different frequencies, and/or on different code domain resources, and/or antenna ports that have different antenna port numbers and that are used to send or receive information at different time, and/or on different frequencies, and/or on different code domain resources. The resource indicator may include: a CSI-RS resource indicator, an SRS resource indicator, an SSB resource indicator, a resource indicator of a preamble sequence transmitted on a physical random access channel (Physical Random Access Channel, PRACH), or a resource indicator of a demodulation reference signal (demodulation reference signal, DMRS), and used to indicate a beam on a resource.

In the NR protocol, the QCL relationship may be classified into the following four types based on different parameters:
type A (type A): the Doppler shift, the Doppler spread, the average delay, and the delay spread;
type B (type B): the Doppler shift and the Doppler spread;
type C (type C): the Doppler shift and the average delay; and
type D (type D): the spatial receive parameter.

The QCL in the embodiments of this application is QCL of the type D. Unless otherwise specified below, the QCL may be understood as the QCL of the type D, namely, QCL defined based on the spatial receive parameter.

When the QCL relationship is a QCL relationship of the type D, the QCL relationship may be considered as a spatial QCL relationship. When the antenna ports satisfy the spatial QCL relationship, a QCL relationship between ports for downlink signals or between ports for uplink signals may be that the two signals have a same AOA or AOD, and is used to indicate that the two signals have a same receive beam or transmit beam. For another example, a QCL relationship between a port for a downlink signal and a port for an uplink signal or between a port for an uplink signal and a port for a downlink signal may be that there is a correspondence between AOAs and AODs of the two signals, or that there is a correspondence between AODs and AOAs of the two signals. To be specific, beam reciprocity may be used to determine an uplink transmit beam based on a downlink receive beam or determine a downlink receive beam based on an uplink transmit beam.

From a perspective of the transmit end, if there is a spatial QCL relationship between two antenna ports, it may mean that corresponding beam directions of the two antenna ports are consistent in space. From a perspective of the receive end, if there is a spatial QCL relationship between two antenna ports, it may mean that the receive end can receive, in a same beam direction, signals sent through the two antenna ports.

Signals transmitted on ports having a spatial QCL relationship may further have a corresponding beam. The corresponding beam includes at least one of the following: a same receive beam, a same transmit beam, a transmit beam corresponding to a receive beam (corresponding to a reciprocity scenario), and a receive beam corresponding to a transmit beam (corresponding to a reciprocity scenario).

Signals transmitted on ports having a spatial QCL relationship may alternatively be understood as signals received or sent by using a same spatial filter (spatial filter). The spatial filter may be at least one of the following: precoding, a weight of an antenna port, a phase deflection of the antenna port, and an amplitude gain of the antenna port.

Signals transmitted on ports having a spatial QCL relationship may alternatively be understood as having a corresponding beam pair link (beam pair link. BPL). The corresponding BPL includes at least one of the following: a same downlink BPL, a same uplink BPL, an uplink BPL corresponding to a downlink BPL, and a downlink BPL corresponding to an uplink BPL.

Therefore, the spatial receive parameter (namely, the QCL of the type D) may be understood as a parameter used to indicate direction information of a receive beam.

Transmission configuration indicator (transmission configuration indicator, TCI): The transmission configuration indicator may be used to indicate a QCL relationship between two types of reference signals. The network device may configure a TCI state (TCI state) list for the terminal device by using higher layer signaling (for example, a radio resource control (radio resource control, RRC) message), and may activate or indicate one or more TCI states in the TCI state list by using higher layer signaling (for example, a MAC CE) or physical layer signaling (for example, DCI). Specifically, the network device may configure the TCI state list for the terminal device by using an RRC message. When receiving a physical downlink control channel (physical downlink control channel, PDCCH) from the network device, the terminal device may activate one or more control channel TCI state lists based on an indication of a MAC CE, where the control channel TCI state list is a subset of the foregoing TCI state list. The terminal device may obtain DCI from the PDCCH, and then select one or more TCI states from a data channel TCI state list based on an indication of the DCI, where the data channel TCI state list is a subset of the foregoing TCI state list, and is indicated to the terminal device by using MAC-CE signaling.

One piece of configuration information of the TCI state may include an indicator of one or two reference signal resources and an associated QCL type. When a QCL relationship is configured to one of the type A, the type B. or the type C, the terminal device may demodulate a PDCCH or a PDSCH based on an indication of the TCI state.

When the QCL relationship is configured to the type D, the terminal device may learn of a transmit beam used by the network device to transmit a signal, and then may determine, based on a beam pairing relationship determined through channel measurement, a receive beam used to receive the signal.

It should be noted that some names and English abbreviations in this specification are descriptions of the embodiments of this application by using an LTE system or a 5G system as an example. However, the embodiments of this application are not limited thereto, and may change with network evolution. For specific evolution, refer to descriptions in a corresponding standard.

Figure 3:
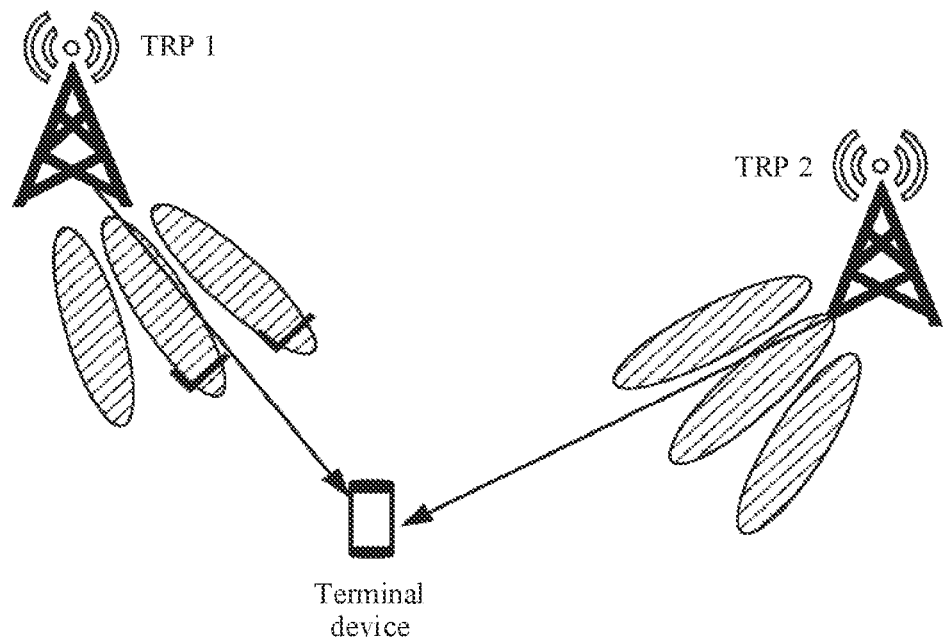
FIG. 3 is a schematic diagram of beam training according to an embodiment of this application.

In a CoMP system, an optional beam training manner is as follows: Downlink beams of at least two transmission points in joint transmission are trained through one time of beam scanning. For example, as shown in FIG. 3, in one time of beam scanning and reporting, beams of a TRP 1 and a TRP 2 are traversed. In this case, this is equivalent to separately sending a reference signal resource in an NZP-CSI-RS resource set by using the beams of the TRP 1 and the TRP 2 in turn. In this case, because a specific power difference is caused by distances between two transmission points and the terminal device, the terminal device may select, based on an RSRP, a plurality of beams from a same transmission point, for example, two beams of the TRP 1, for reporting. In this case, multipoint coordination cannot be implemented during subsequent data sending.

Figure 4:
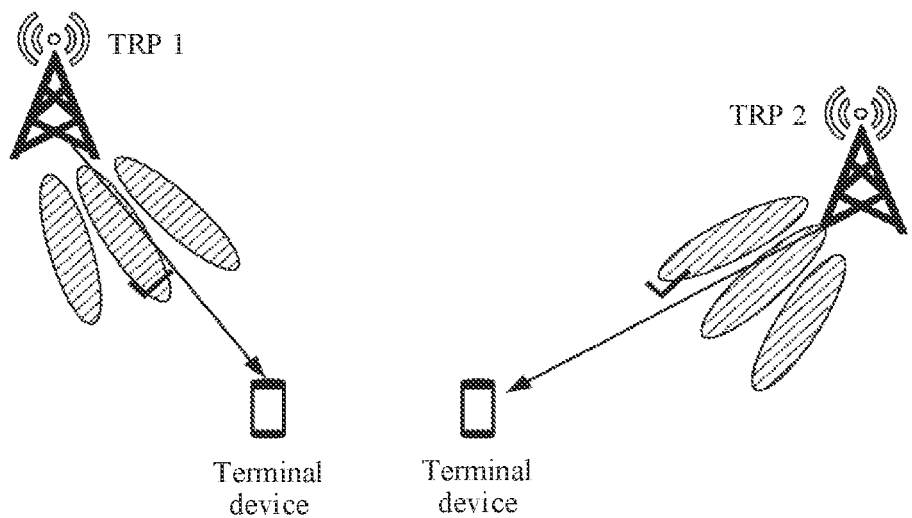
FIG. 4 is a schematic diagram of beam training according to another embodiment of this application.

In the CoMP system, another optional beam training manner is as follows: Each transmission point in joint transmission trains a downlink beam through one time of beam scanning. For example, as shown in FIG. 4, beam scanning and reporting are performed twice, and beams of a TRP 1 and a TRP 2 are separately scanned. In this case, it is equivalent to describing that there are two reporting settings (reporting setting) that are respectively associated with two reference signal resource sets (resource set), where reference signal resources in the two resource sets are respectively sent by using the beams of the TRP 1 and the TRP 2 in turn. In this case, after performing beam scanning for the first time, the terminal device selects a beam from the TRP 1 for reporting, and after performing beam scanning for the second time, the terminal device selects a beam from the TRP 2 for reporting. However, in this case, receive beams used by the terminal device to receive transmit beams of different TRPs that are selected and reported may not be the same, or the two receive beams may not coexist. In this case, when the two TRPs communicate with the terminal device by using their respective transmit beams, the terminal device may not simultaneously receive signals sent by the two TRPs, and can receive a signal from only one of the TRPs. Consequently, a communication service is affected.

In conclusion, it can be learned that the foregoing two beam training manners in the CoMP system both have some disadvantages. Therefore, how to perform beam training in the CoMP system becomes an urgent problem to be resolved.

In view of the foregoing problem, an embodiment of this application provides a beam training method, to resolve the foregoing problem. Specifically, in this application, related information of beams of at least two transmission points is reported through one time of beam scanning, to implement beam training in a CoMP system.

Specifically, in this embodiment of this application, reference signal resources may be grouped. For example, one reference signal resource group may correspond to one network device in joint transmission. A terminal device selects to-be-reported beams from different transmit beam resource groups, and the beams reported by the terminal device can be simultaneously received by the terminal device. Therefore, downlink beams of a plurality of network devices in joint transmission are trained through one time of scanning.

Figure 5:
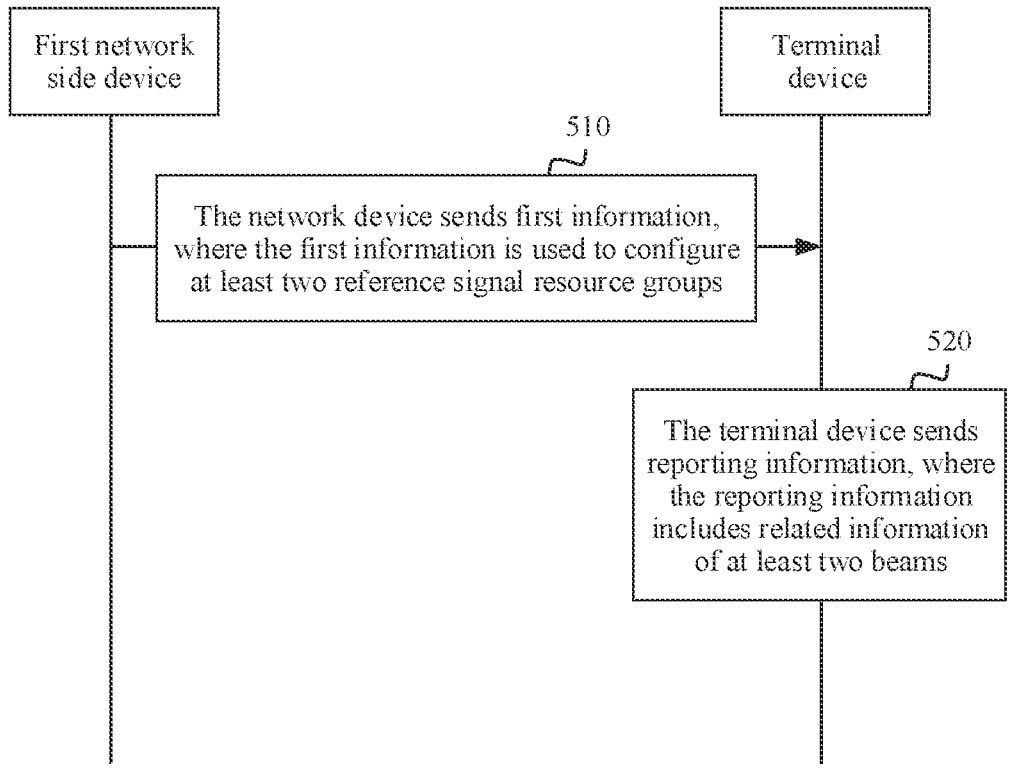
FIG. 5 is a flowchart of a multi-beam grouping-based reporting method according to an embodiment of this application.

For ease of understanding and description, by way of example and not limitation, the following describes an execution process and an action of the method in this application in a communications system with reference to FIG. 5.

It should be understood that, in this embodiment of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more computer operating systems for implementing service processing by using a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in this embodiment of this application is not particularly limited in this embodiment of this application, provided that communication can be performed according to the method provided in this embodiment of this application by running a program that records code of the method provided in this embodiment of this application. For example, the method provided in this embodiment of this application may be performed by the terminal device or the network device, or a functional module that is in the terminal device or the network device and that can invoke a program and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (compact disc, CD), or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine-readable media" may include but are not limited to a radio channel, and various other media that can store, contain, and/or carry instructions and/or data.

FIG. 5 is a schematic flowchart of a multi-beam grouping-based reporting method 500 according to an embodiment of this application. The method shown in FIG. 5 may be applied to the communications system that supports CoMP shown in FIG. 1. It should be understood that a joint transmission scenario to which this embodiment of this application is applicable and that is shown in FIG. 1 may be a joint transmission scenario of a homogeneous network or a joint transmission scenario of a heterogeneous network. This is not limited in this embodiment of this application. It should be further understood that, the scenario shown in FIG. 1 may be a low-frequency scenario, or may be a high-frequency scenario. This is not limited in this embodiment of this application.

Specifically, the method 500 shown in FIG. 5 includes the following steps.

510. A network device sends first information, where the first information is used to configure at least two reference signal resource groups.

Correspondingly, a terminal device receives the first information.

It should be understood that the network device may be any one of a plurality of network devices in CoMP. For example, the first information is sent by a serving network device or a coordinated network device. This is not limited in this embodiment of this application.

It should be understood that the at least two reference signal resource groups may be in a one-to-one correspondence with at least two network devices in joint transmission. In other words, each network device in joint transmission corresponds to one reference signal resource group, and each network device may send a reference signal by using a resource in the reference signal resource group corresponding to the network device.

It should be understood that the method in this embodiment of this application is described in this specification by using only an example in which the method is applied to the CoMP system. However, this embodiment of this application is not limited thereto. The method in this embodiment of this application may be further applied to another scenario, for example, may be applied to a single transmission point transmission scenario.

It should be understood that the at least two reference signal resource groups in this embodiment of this application may alternatively correspond to a same network device. This embodiment of this application is not limited to a scenario in which different reference signal resource groups correspond to different network devices.

520. The terminal device sends reporting information, where the reporting information includes related information of at least two beams, the at least two beams are used to send reference signals carried on at least two reference signal resources, and the reference signals sent by using the at least two beams can be simultaneously received by the terminal device, w % here the at least two reference signal resources are respectively from the at least two reference signal resource groups.

Correspondingly, the network device receives the reporting information sent by the terminal device.

Specifically, in this embodiment of this application, reference signal resources are grouped. For example, one reference signal resource group may correspond to one network device in joint transmission. The terminal device selects to-be-reported beams from different transmit beam resource groups, and the beams reported by the terminal device can be simultaneously received by the terminal device. In other words, in this embodiment of this application, related information of at least one beam is reported for each reference signal resource group, so that a transmit beam of a network device corresponding to the reference signal resource group can be trained. Therefore, in this embodiment of this application, downlink beams of a plurality of network devices in joint transmission can be trained through one time of scanning.

It should be understood that in this embodiment of this application, a quantity of the at least two reference signal resources may be equal to a quantity of the at least two reference signal resource groups. In this case, the at least two reference signal resources include one reference signal resource in each reference signal resource group. In other words, for each reference signal resource group, the terminal device reports related information of a beam corresponding to the one reference signal resource.

Optionally, a quantity of the at least two reference signal resources may be greater than a quantity of the at least two reference signal resource groups. In this case, the at least two reference signal resources include one or more reference signal resources in each reference signal resource group. In other words, for each reference signal resource group, the terminal device reports related information of a beam corresponding to the one or more reference signal resources.

It should be noted that, in this embodiment of this application, the terminal device has a capability of simultaneously receiving the reference signals sent by using the at least two beams. During actual application, the network device may simultaneously send the reference signals by using the at least two beams, or may sequentially send the reference signals. In other words, the terminal device may simultaneously receive the reference signals sent by using the at least two beams, or may sequentially receive the reference signals sent by using the at least two beams, and the terminal device may receive, by using a same receive beam, the reference signals sent by using the at least two beams, or may receive, by using at least two receive beams that may simultaneously exist, the reference signals sent by using the at least two beams. Specifically, how the terminal device determines that the terminal device has the foregoing capability is implemented by the terminal device. This is not limited in this embodiment of this application.

Optionally, in an implementation, the related information of the at least two beams in this embodiment of this application includes at least two reference signal received powers and at least two reference signal resource indicators that are in a one-to-one correspondence with the at least two reference signal received powers.

It should be understood that in this embodiment of this application, the related information of the beam may have a plurality of possible forms, provided that the related information of the beam can indicate the terminal device to select and report the at least two beams. This embodiment of this application is not limited to the reference signal received power and the reference signal resource indicator. For example, the related information of the at least two beams may alternatively be signal-to-noise ratios of the reference signals sent by using the at least two beams.

It should be understood that, in this embodiment of this application, the first information may have a plurality of possible implementations. This is not specifically limited in this embodiment of this application, provided that the at least two reference signal resource groups can be configured by using the first information.

By way of example and not limitation, the following describes in detail the first information in this application with reference to specific examples.

Case 1:

The reference signal resource group is a reference signal resource set, and the at least two reference signal resource groups are configured by directly configuring, activating, or triggering at least two reference signal resource sets based on the first information.

Optionally, the first information is carried in at least one of the following signaling:

radio resource control RRC signaling, a media access control control element MAC-CE, and downlink control information DCI.

It should be understood that the first information may be carried in any one of the foregoing signaling, or may be carried in a plurality of pieces of the foregoing signaling. This is not limited in this embodiment of this application.

For example, in an implementation, the first information is carried in a plurality of pieces of the foregoing signaling. For example, it is assumed that the first information may include first sub-information and second sub-information. The first sub-information is used to configure a plurality of reference signal resource groups, for example, the first sub-information is used to configure the plurality of reference signal resource groups by configuring the at least two reference signal resource sets, and the first sub-information may be carried in one of the foregoing signaling, for example, carried in the RRC signaling. The second sub-information may be used to activate or trigger one or more of the plurality of reference signal resource groups that are configured by using the foregoing first sub-information, and the second sub-information may be carried in another one of the foregoing signaling, for example, carried in the DCI.

For example, the first sub-information is used to configure three reference signal resource groups: a reference signal resource group #1, a reference signal resource group #2, and a reference signal resource group #3. Specifically, the first sub-information may be used to configure the three reference signal resource groups by configuring three reference signal resource sets. For example, the first sub-information is used to configure a resource set #1, a resource set #2, and a resource set #3. The resource set #1 is used as the reference signal resource group #1, the resource set #2 is used as the reference signal resource group #2, and the resource set #3 is used as the reference signal resource group #3. The second sub-information may be used to activate or trigger one or more of the foregoing three reference signal resource groups. For example, the second sub-information is used to activate or trigger the reference signal resource group #1 and the reference signal resource group #2.

By way of example and not limitation, the following describes, with reference to Table 1, a case in which the first information is carried in one of the foregoing signaling.

It should be understood that in this embodiment of this application, resource types (resource type) in a resource setting (resource setting) may be configured to three time domain periodic behaviors: periodic (periodic), semi-persistent (semi-persistent), and aperiodic (aperiodic). For the three periodic behaviors, the network device may activate or trigger the at least two reference signal resource sets at a time to configure the at least two reference signal resources.

It should be understood that, in this embodiment of this application, the "directly configuring" the at least two reference signal resource sets may indicate that when receiving an RRC configuration message, the terminal device directly activates all resource sets associated with the resource setting.

Specifically, as shown in the second row in Table 1, the first information may be carried in the RRC. For example, one resource setting associated with a plurality of resource sets may be configured for the terminal device by using the RRC, that is, a quantity of resource sets is greater than 1. In this case, there is no special activation instruction; when receiving the RRC configuration message, the terminal device directly configures (or directly activates) all resource sets associated with the resource setting; and a reference signal resource in each activated resource set forms one reference signal resource group.

For example, if the plurality of resource sets included in the resource setting are the resource set #1 and the resource set #2, after obtaining the first message, the terminal device may determine that the resource set #1 corresponds to one reference signal resource group, for example, the reference signal resource group #1; and the resource set #2 correspond to one reference signal resource group, for example, the reference signal resource group #2. In other words, after obtaining the first message, the terminal device uses the resource set #1 as the reference signal resource group #1, and uses the resource set #2 as the reference signal resource group #2.

In this case, the resource type (resource type) in the resource setting (resource setting) may be configured to periodic (periodic), that is, the reference signal may be sent in a periodic manner.

In another implementation, as shown in the third row in Table 1, the first information may be carried in the MAC-CE. In this case, the resource setting also includes a plurality of resource sets, that is, a quantity of resource sets is greater than 1. In this case, at least two of the plurality of resource sets included in the resource setting may be activated by using the MAC-CE signaling, and a reference signal resource in each activated resource set forms one reference signal resource group.

For example, the plurality of resource sets included in the resource setting are a total of three reference signal resource sets: the resource set #1, the resource set #2, and the resource set #3, and the resource set #1 and the resource set #2 in the three reference signal resource sets are activated by using the MAC-CE signaling obtained by the terminal device. In this case, the terminal device may determine that the resource set #1 corresponds to one reference signal resource group, for example, the reference signal resource group #1, and the resource set #2 corresponds to one reference signal resource group, for example, the reference signal resource group #2. In other words, after obtaining the first message, the terminal device uses the resource set #1 as the reference signal resource group #1, and uses the resource set #2 as the reference signal resource group #2.

In this case, the resource type (resource type) in the resource setting (resource setting) may be configured to semi-persistent (semi-persistent), that is, the reference signal may be sent in a semi-persistent manner.

In another implementation, as shown in the fourth row in Table 1, the first information may be carried in the DCI. In this case, the resource setting also includes a plurality of resource sets, that is, a quantity of resource sets is greater than 1. In this case, at least two of the plurality of resource sets included in the resource setting may be triggered by using the DCI, and a reference signal resource in each triggered resource set forms one reference signal resource group.

For example, the plurality of resource sets included in the resource setting are a total of three reference signal resource sets: the resource set #1, the resource set #2, and the resource set #3, and the resource set #2 and the resource set #3 in the three reference signal resource sets are triggered by using the DCI obtained by the terminal device. In this case, the terminal device may determine that the resource set #2 corresponds to one reference signal resource group, for example, the reference signal resource group #1, and the resource set #3 corresponds to one reference signal resource group, for example, the reference signal resource group #2. In other words, after obtaining the first message, the terminal device uses the resource set #2 as the reference signal resource group #1, and uses the resource set #3 as the reference signal resource group #2.

In this case, the resource type (resource type) in the resource setting (resource setting) may be configured to aperiodic (aperiodic), that is, the reference signal may be sent in an aperiodic manner.

It should be understood that the reference signal resource groups #1, #2, and #3 in this embodiment are merely examples for ease of understanding. During specific implementation of the method in this embodiment, the reference signal resource group and the reference signal resource set may be understood as a same concept.

TABLE 1

| Resource type (resource type) | Quantity of reference signal resource sets (resource set) | Transmission mode |
|---|---|---|
| Periodic (periodic) | Greater than 1 | A resource setting is associated with a plurality of resource sets, and there is no special activation instruction. When an RRC configuration message is received, all resource sets associated with the resource setting are directly activated. |
| Semi-persistent (semi-persistent) | Greater than 1 | A resource setting is associated with a plurality of resource sets, and at least two of the plurality of resource sets associated with the resource setting are activated by using MAC-CE signaling. |
| Aperiodic (aperiodic) | Greater than 1 | A resource setting is associated with a plurality of resource sets, and at least two of the plurality of resource sets associated with the resource setting are triggered by using DCI. |

It should be understood that Table 1 describes examples in which when the first information is carried in the RRC, the MACE-CE, or the DCI, the reference signal is sent in the periodic manner, the semi-persistent manner, or the aperiodic manner respectively. However, this embodiment of this application is not limited thereto. During actual application, signaling carrying the first information may be randomly combined with a sending manner of the reference signal. For example, when the first information is carried in the RRC, the reference signal may be sent in the semi-persistent manner or the aperiodic manner.

Regardless of a time domain periodic behavior, for a resource setting, if transmission of only one reference signal included in a resource set associated with the resource setting is activated/triggered at a same moment, beam training in the CoMP system cannot be better implemented.

However, in this embodiment of this application, according to the configuration method shown in Table 1, resource grouping can be implemented. To be specific, for a resource setting, transmission of reference signals included in a plurality of resource sets associated with the resource setting can be activated/triggered at a same moment, and a reference signal resource in each activated/triggered resource set forms one reference signal resource group. Therefore, in this embodiment of this application, the network device activates/triggers a plurality of resource sets at a time, to implement reference signal resource grouping, and reports related information of at least one beam for each resource group, to train a beam of a network device corresponding to the resource group.

In this embodiment of this application, after receiving the first information, the terminal device may determine the plurality of configured reference signal resource groups, and then the terminal device may send the reporting information in the manner in step 520. The related information of the at least two beams included in the foregoing reporting information is at least two reference signal received powers and at least two reference signal resource indicators that are in a one-to-one correspondence with the at least two reference signal received powers. For example, the terminal device determines that when a plurality of resource sets associated with one resource setting are directly configured to be all activated, or are activated by using one piece of MAC-CE activation signaling, or are triggered by using one DCI trigger instruction, the terminal device sets in such a manner that reference signal resource indicators (for example, CRIs or SSB indexes) included in reported CSI need to be from reference signal resources in different resource sets, to train beams of a plurality of network devices.

Case 2:

The first information includes QCL configuration information of reference signal resources in a same reference signal resource set, and reference signal resources with same QCL configuration information are configured as a same reference signal resource group.

Specifically, in Case 2, the network device first configures a reference signal resource set (resource set) for the terminal device. For example, the reference signal resource set may be configured in an existing manner. Each reference signal resource in the resource set may be associated with one piece of QCL configuration information (qcl info).

It should be understood that the QCL-info may be a TCI state identifier (TCI state ID) in a one-to-one correspondence with a reference signal resource. The following uses an example in which the QCL-info is the TCI state ID for description. However, this embodiment of this application is not limited thereto.

It should be understood that, in the method in this embodiment, the TCI state ID may be used as a reference signal resource grouping identifier instead of beam indication information.

In other words, in this embodiment of this application, an existing TCI state ID may be reused to perform reference signal resource grouping.

Optionally, the foregoing reuse method may take effect only in some scenarios (for example, a specific scenario in the following description). Specifically, for a scenario in which the foregoing reuse method takes effect, refer to the following description. For example, the scenario is a scenario in which one or more of a condition 1 to a condition 4 in the following description are met, and details are not described herein.

Therefore, in this embodiment of this application, the existing TCI state ID is reused to group reference signal resources, so that implementation complexity of resource grouping can be reduced.

Optionally, the first information is carried in at least one of the following signaling:

radio resource control RRC signaling, a media access control control element MAC-CE, and downlink control information DCI.

For example, in an implementation, the first information is carried in a plurality of pieces of the foregoing signaling. For example, it is assumed that the first information may include first sub-information and second sub-information. The first sub-information is used to configure a plurality of TCI state ID sequences corresponding to reference signal resources in a same resource set, and the first sub-information may be carried in one of the foregoing signaling, for example, carried in the RRC signaling. The second sub-information may be used to select one of the plurality of sequences, and the second sub-information may be carried in another one of the foregoing signaling, for example, carried in the DCI.

For example, a resource set includes six reference signal resources, a plurality of TCI state ID sequences are configured by using the first information, and each TCI state ID sequence includes six TCI state IDs. It is assumed that five TCI state ID sequences may be configured by using the first sub-information. Specifically, each of the five sequences includes six TC state IDs corresponding to a resource #1 to a resource #6. For example, the five sequences are as follows:

Sequence 1: The six TCI state IDs corresponding to the resource #1 to the resource #6 are TCI state IDs #1, #1, #1, #1, #2, and #2 respectively.

Sequence 2: The six TCI state IDs corresponding to the resource #1 to the resource #6 are TCI state IDs #1, #2, #1, #1, #2, and #2 respectively.

Sequence 3: The six TCI state IDs corresponding to the resource #1 to the resource #6 are TCI state IDs #1, #1, #1, #1, #1, and #2 respectively.

Sequence 4: The six TCI state IDs corresponding to the resource #1 to the resource #6 are TCI state IDs #1, #1, #2, #1, #2, and #1 respectively.

Sequence 5: The six TCI state IDs corresponding to the resource #1 to the resource #6 are TCI state IDs #2, #1. #1, #1, #2, and #2 respectively.

The second sub-information is used to select one of the plurality of sequences. For example, the second sub-information is three bits, and the three bits may indicate one sequence number in the five sequences. For example, the sequence number indicated by the second sub-information is 5. In this case, grouping states of the six resources are that the resource #1, the resource 5, and the resource 6 (where corresponding TC state IDs are all #2) are one reference signal resource group, and resource numbers #2, #3, and #4

(where corresponding TCI state IDs are all #1) are another reference signal resource group.

It should be understood that a quantity of bits of the second sub-information corresponds to a quantity of sequences configured by using the first sub-information, provided that the second sub-information can indicate any one of the plurality of sequences. This is not specifically limited in this embodiment of this application.

By way of example and not a limitation, the following describes, with reference to Table 2, a case in which the first information is carried in one piece of signaling.

It should be understood that in this embodiment of this application, resource types (resource type) in a resource setting (resource setting) may be configured to three time domain periodic behaviors: periodic (periodic), semi-persistent (semi-persistent), and aperiodic (aperiodic).

Specifically, as shown in the second row in Table 2, the first information may be carried in the RRC. For example, one resource set includes a plurality of NZP-CSI-RS resources, and the first information may be configured in configuration information of the NZP-CSI-RS resource. In other words, the first information may be a parameter field of the NZP-CSI-RS resource. For example, the configuration information of the NZP-CSI-RS resource includes a TC state ID. In this case, after receiving the configuration information of the reference signal resource, the terminal device may determine reference signal resources for which a same TCI state ID is configured in the resource set as a same reference signal resource group.

It should be understood that, in this embodiment of this application, the reference signal resource included in the resource set may be a zero-power reference signal resource or a non-zero-power reference signal resource, and the reference signal may be a CSI-RS, an SSB, an SRS, or the like. In Table 2, only an example in which the resource set includes the NZP-CSI-RS resource is used for description. However, this embodiment of this application is not limited thereto.

For example, in an implementation, the first information may alternatively be configured in configuration information of a zero-power channel state information reference signal ZP-CSI-RS resource, that is, the first information may be a parameter field for configuring the ZP-CSI-RS resource. This embodiment of this application is not limited thereto.

For example, one resource set includes a resource #1 to a resource #8 in total, TCI state IDs corresponding to the resource #1 to the resource #4 are a TC state ID #1, and TCI state IDs corresponding to the resource #5 to the resource #8 are a TCI state ID #2. In this case, after receiving an RRC message carrying the first information, the terminal device may determine that the resource set #1 to the resource #4 correspond to a same reference signal resource group, for example, the reference signal resource group #1, and the resource set #5 to the resource #8 correspond to a same reference signal resource group, for example, the reference signal resource group #2.

In this case, a resource type (resource type) in a resource setting (resource setting) associated with the resource set may be configured to periodic (periodic), that is, the reference signal may be sent in the periodic manner.

In another implementation, as shown in the third row in Table 2, the first information may be carried in the MAC-CE. For example, one resource set includes a plurality of NZP-CSI-RS resources, and the first information may be a group of parameters in MAC-CE activation signaling associated with the resource set, for example, a sequence including a group of TC state IDs, where a quantity of TCI state IDs is equal to a quantity of NZP-CSI-RS resources included in the resource set, that is, the group of TC state IDs are in a one-to-one correspondence with the NZP-CSI-RS resources in order. In this case, after receiving the MAC-CE message, the terminal device may determine reference signal resources corresponding to a same TC state ID as a same reference signal resource group.

For example, a resource set in Case 2 includes a resource #1 to a resource #8 in total, and a TC state ID sequence in MAC-CE activation signaling associated with the resource set includes eight TCI state IDs, where the first four TCI state IDs are #1, and the last four TCI state IDs are #2. Therefore, TC state IDs corresponding to the resource #1 to the resource #4 are the TCI state ID #1, and TCI state IDs corresponding to the resource #5 to the resource #8 are the TC state ID #2. In this case, after receiving the MAC-CE signaling carrying the first information, the terminal device may determine that the resource set #1 to the resource #4 correspond to a same reference signal resource group, for example, the reference signal resource group #1; and the resource set #5 to the resource #8 correspond to a same reference signal resource group, for example, the reference signal resource group #2.

In this case, a resource type (resource type) in a resource setting (resource setting) associated with the resource set may be configured to semi-persistent (semi-persistent), that is, the reference signal is sent in the semi-persistent manner.

In another implementation, as shown in the fourth row in Table 2, the first information may be carried in the DCI. For example, one resource set includes a plurality of NZP-CSI-RS resources, and the first information may be a group of parameters in DCI trigger signaling associated with the resource set, for example, a sequence including a group of TCI state IDs, where a quantity of TCI state IDs is equal to a quantity of NZP-CSI-RS resources included in the resource set, that is, the group of TCI state IDs are in a one-to-one correspondence with the NZP-CSI-RS resources in order. In this case, after receiving a DCI message, the terminal device may determine reference signal resources corresponding to a same TCI state ID as a same reference signal resource group.

For example, a resource set in case 2 includes a resource #1 to a resource #8 in total, and a TCI state ID sequence in DCI trigger signaling associated with the resource set includes eight TCI state IDs, where the first, third, fifth, and seventh TCI state IDs are #1, and the second, fourth, sixth, and eighth TCI state IDs are #2. Therefore, TCI state IDs corresponding to the resources #1, #3, #5, and #7 are the TCI state ID #1, and the TCI state IDs corresponding to the resources #2, #4, #6, and #8 are the TCI state ID #2. In this case, after receiving the DCI carrying the first information, the terminal device may determine that the resource sets #1, #3, #5, and #7 correspond to a same reference signal resource group, for example, the reference signal resource group #1; and the resource sets 2, #4, #6, and #8 correspond to a same reference signal resource group, for example, the reference signal resource group #2.

In this case, a resource type (resource type) in a resource setting (resource setting) associated with the resource set may be configured to aperiodic (aperiodic).

TABLE 2

| Resource type (resource type) | Configuration mode |
| --- | --- |
| Periodic (periodic) | A parameter field of an NZP-CSI-RS resource |
| Semi-persistent (semi-persistent) | A group of parameters in MAC-CE activation signaling, which are in a one-to-one correspondence with resources in a resource set |
| Aperiodic (aperiodic) | A group of parameters in DCI trigger signaling, which are in a one-to-one correspondence with resources in a resource set |

After receiving the first information in the foregoing Case 2, the terminal device may determine the plurality of configured reference signal resource groups, and then the terminal device may send the reporting information in the manner in 520. Specifically, the terminal device first determines a plurality of reference signal resource groups in a same resource set based on the TCI state ID, and then the terminal device sets in such a manner that reference signal resource indicators (for example, CRIs or SSB indexes) included in reported CSI need to be from different reference signal resource groups, to train beams of a plurality of network devices.

In this embodiment of this application, the reference signal resources with the same QCL configuration information are configured as the same reference signal resource group, so that the at least two reference signal resource groups are configured. Because different network devices correspond to different reference signal resource groups, for each reference signal resource group, the terminal device reports related information of one or more beams corresponding to the terminal device. Therefore, in this embodiment of this application, downlink beams of a plurality of network devices in joint transmission are simultaneously trained.

Case 3:

The first information is resource setting information, and the resource setting information is used to configure the at least two reference signal resource groups by configuring identifier sequence numbers of reference signal resources in a same reference signal resource set.

For example, the first information is resource setting (resource setting) information. Specifically, the first information may be used to configure the at least two reference signal resource groups by configuring reference signal resource indicator sequence numbers in a same resource set.

Optionally, the first information is carried in at least one of the following signaling:

radio resource control RRC signaling, a media access control control element MAC-CE, and downlink control information DCI.

In an implementation, the first information is carried in a plurality of pieces of the foregoing signaling. For example, it is assumed that the first information may include first sub-information and second sub-information, for example, the first sub-information is used to indicate a plurality of grouping rules, and each grouping rule includes a relationship between a reference signal resource group and a reference signal resource indicator sequence number. The second sub-information is used to select one grouping rule from the plurality of grouping rules indicated by the first sub-information.

For example, assuming that reference signal resource indicator sequence numbers in a same reference signal resource set are 1 to 8 and 10 to 16, the first sub-information is used to indicate two grouping rules. For example, a grouping rule 1 is that reference signal resources with consecutive reference signal resource indicator sequence numbers in a same reference signal resource set belong to a same reference signal resource group; and a grouping rule 2 is that in a same reference signal resource set, reference signal resources whose reference signal resource indicator sequence numbers are even numbers belong to a same reference signal resource group, and reference signal resources whose reference signal resource indicator sequence numbers are odd numbers belong to another reference signal resource group. For example, the second sub-information may indicate an identifier of one of the grouping rules. For example, if the second sub-information indicates that a grouping rule identifier is 1, the terminal device may determine, based on the first sub-information and the second sub-information, that reference signal resources whose sequence numbers are 1 to 8 belong to one reference signal resource group, and reference signal resources whose sequence numbers are 10 to 16 belong to another reference signal resource group.

Optionally, in another implementation, the first information may alternatively be carried in one of the foregoing signaling, for example, carried in the RRC. This is not limited in this embodiment of this application.

By way of example and not a limitation, an example in which the first information is resource setting (resource setting) information and is carried in the RRC is used below to describe the multi-beam grouping-based reporting method in Case 3 of this application with reference to a specific example.

For example, in this embodiment of this application, the reference signal resource group may be determined based on the reference signal resource indicator sequence number by using a predetermined rule.

Specifically, the predetermined rule may be that reference signal resources with consecutive reference signal resource indicator sequence numbers in a same reference signal resource set belong to a same reference signal resource group.

For example, if reference signal resource indicator sequence numbers configured in the first information are 1 to 8 and 10 to 16, according to the foregoing preset rule, reference signal resources whose sequence numbers are 1 to 8 belong to one reference signal resource group, and reference signal resources whose sequence numbers are 10 to 16 belong to another reference signal resource group.

Alternatively, the predetermined rule may be that a reference signal resource whose reference signal resource indicator sequence number is an odd number belongs to a reference signal resource group, and a reference signal resource whose reference signal resource indicator sequence number is an even number belongs to another reference signal resource group.

For example, if reference signal resource indicator sequence numbers configured by using the first information are 1 to 8 and 10 to 16, according to the foregoing preset rule, reference signal resources whose sequence numbers are 1, 3, 5, 7, 11, 13, and 15 belong to one reference signal resource group, and reference signal resources whose sequence numbers are 2, 4, 6, 8, 10, 12, 14 and 16 belong to another reference signal resource group.

Alternatively, the predetermined rule is that a reference signal resource whose reference signal resource indicator sequence number is greater than an average sequence number/intermediate value belongs to one reference signal resource group, and a reference signal resource whose reference signal resource indicator sequence number is less than the average sequence number/intermediate value belongs to another reference signal resource group.

For example, if reference signal resource indicator sequence numbers configured by using the first information are 1 to 8 and 10 to 16, according to the foregoing preset rule, a reference signal resource whose reference signal resource indicator sequence number is greater than an average sequence number belongs to one reference signal resource group, and a reference signal resource whose reference signal resource indicator sequence number is less than the average sequence number belongs to another reference signal resource group. Because the average value= (1+2, . . . , +8+10+ . . . +16)/15=8.47, the sequence numbers 1 to 8 are all less than 8.47, and the sequence numbers 10 to 16 are all greater than 8.47, reference signal resources whose sequence numbers are 1 to 8 belong to one reference signal resource group, and reference signal resources whose sequence numbers are 10 to 16 belong to another reference signal resource group.

It should be noted that when a reference signal resource indicator sequence number is equal to the average value/intermediate value, a reference signal resource corresponding to the reference signal resource indicator sequence number may belong to a reference signal resource group with a sequence number being less than the average value/intermediate value, or belong to a reference signal resource group with a sequence number being greater than the average value/intermediate value. This is not limited in this application.

For example, if reference signal resource indicator sequence numbers configured by using the first information are 1 to 8 and 10 to 16, according to the foregoing preset rule, a reference signal resource whose reference signal resource indicator sequence number is greater than an intermediate sequence number belongs to one reference signal resource group, and a reference signal resource whose reference signal resource indicator sequence number is less than the intermediate sequence number belongs to another reference signal resource group. Because an intermediate value of a total of 15 sequence numbers from 1 to 8 and from 10 to 16 are 8, the sequence numbers 1 to 7 are all less than 8, and the sequence numbers 10 to 16 are all greater than 8, reference signal resources whose sequence numbers are 1 to 7 belong to one reference signal resource group, and reference signal resources whose sequence numbers are 10 to 16 belong to another reference signal resource group. Because the reference signal resource indicator sequence number 8 is equal to the intermediate value, assuming that a reference signal resource corresponding to the reference signal resource indicator sequence number that is equal to the intermediate value may belong to a reference signal resource group with a sequence number being less than the intermediate value, the reference signal resources whose sequence numbers are 1 to 8 may be finally grouped into one reference signal resource group, and the reference signal resources whose sequence numbers are 10 to 16 may be finally grouped into another reference signal resource group.

It should be understood that when the plurality of reference signal resource indicator sequence numbers are odd numbers, the intermediate value is a sequence number at a middlemost location obtained through sorting in ascending (or descending) order of the reference signal resource indicator sequence numbers: when the plurality of reference resource indicator sequence numbers are even numbers, the intermediate value is an average value of two sequence numbers corresponding to two middlemost locations obtained through sorting in ascending order (or descending) of the reference signal resource indicator sequence numbers, or the intermediate value is a larger one or a smaller one of two sequence numbers corresponding to two middlemost locations obtained through sorting. This embodiment of this application is not limited thereto.

After receiving the first information, the terminal device may determine the plurality of configured reference signal resource groups, and then the terminal device may send the reporting information in the manner in 520. Specifically, first, the terminal device may determine a plurality of reference signal resource groups based on reference signal resource indicators configured by using the resource setting information, and then the terminal device sets in such a manner that reference signal resource indicators (for example, CRIs or SSB indexes) included in reported CSI need to be from different reference signal resource groups, to train beams of a plurality of network devices.

In this embodiment of this application, reference signal resources whose reference signal resource sequence numbers meet a rule are grouped into a same reference signal resource group, so that the at least two reference signal resource groups are configured. Because different network devices correspond to different reference signal resource groups, for each reference signal resource group, the terminal device reports related information of one or more beams corresponding to the terminal device. Therefore, in this embodiment of this application, downlink beams of a plurality of network devices in joint transmission are simultaneously trained.

It should be understood that, in this embodiment of this application, after receiving the first information, the terminal device may send the reporting information in the manner (referred to as a multi-beam grouping-based reporting mode below) in the embodiment of Case 1, Case 2, or Case 3. Optionally, in this embodiment of this application, the reporting information may alternatively be sent based on the multi-beam grouping-based reporting mode in a specific scenario, that is, when a specific condition is met.

For example, after receiving the first information and determining that a predetermined condition is met, the terminal device may send the reporting information in the foregoing manner.

Specifically, the preset condition includes at least one of the following conditions:

Condition 1: A report parameter in reporting setting (reporting setting) information includes a beam scanning related parameter. For example, the beam scanning related parameter includes a CRI and an RSRP.

In the condition 1, the grouping-based reporting manner in this embodiment of this application is limited to a beam scanning related measurement and reporting scenario.

Condition 2: A value of a repetition (repetition) parameter in resource setting (resource setting) information is a preset value. For example, the preset value is an off (OFF) state.

That the preset value is the off state may be understood as that transmit beam scanning is currently performed.

In the condition 2, the grouping-based reporting manner in this embodiment of this application is limited to a transmit beam scanning scenario. It should be understood that the preset value of the repetition parameter in the condition 2 may alternatively be an on (ON) state. A specific value of the repetition parameter is not limited in this embodiment of the present invention.

Condition 3: A resource type configured by using the resource setting information is a preset resource type, and the preset resource type is a periodic resource, an aperiodic resource, or a semi-persistent resource.

Based on the condition 3, the method in this embodiment of this application may be limited to a reference signal sending scenario of one or more time domain periodic behaviors. For example, when and only when the CSI-RS is sent in the aperiodic manner, the reporting information can be sent in the grouping-based reporting manner in this embodiment of this application. In this case, the plurality of reference signal resource groups, namely, the reference signal resource sets, are triggered by using DCI signaling. Alternatively, when and only when the CSI-RS is sent in the semi-persistent manner, the reporting information can be sent in the grouping-based reporting manner in this embodiment of this application. In this case, the plurality of reference signal resource groups, namely, the reference signal resource sets, are activated by using MAC-CE signaling. Alternatively, when and only when the CSI-RS is sent in the periodic manner, the reporting information can be sent in the grouping-based reporting manner in this embodiment of this application. In this case, the plurality of reference signal resource groups, namely, the reference signal resource sets, are configured by using RRC signaling. Alternatively, a combination of any two of the foregoing cases is used.

Condition 4: A value of a first parameter in reporting setting (reporting setting) information is a first value, and that the value of the first parameter is the first value indicates that the terminal device supports simultaneous reception of at least two beams.

In the condition 4, with reference to a grouping-based reporting method in the conventional technology, the reference signal resource grouping method is limited to a scenario in which grouping-based reporting is enabled. For example, the first parameter is group based beam reporting (group based beam reporting), and the first value indicates an on state. Specifically, that the group based beam reporting (group based beam reporting) is in the on state indicates that the terminal device has a capability of simultaneously receiving a plurality of beams. It should be understood that when the first parameter is in an off state, it may indicate that the terminal device does not support a capability of receiving a plurality of beams.

It should be understood that the preset condition may include any one of the foregoing four conditions, or may include a plurality of conditions of the foregoing four conditions, for example, the preset condition may include any two of the foregoing four conditions, any three of the foregoing four conditions, or all of the foregoing four conditions. In other words, only when the plurality of conditions are met, the terminal device sends the foregoing reporting information after receiving the first indication information. In other words, the terminal device sets in a such a manner that reference signal resource indicators (CRIs or SSB indexes) included in reported CSI need to be from different reference signal resource groups.

It should be understood that this embodiment of this application merely describes an example in which the reporting information includes the reference signal resource indicator (for example, the CRI or the SSB index) in the CSI. During actual application, the reporting information may further include another parameter such as the reference signal received power, and this embodiment of this application is not limited thereto.

In this embodiment of this application, the terminal device sends the reporting information based on the foregoing multi-beam grouping-based reporting method only when a specific condition is met, so that the multi-beam grouping-based reporting method can be limited to a beam training scenario, thereby avoiding a case in which the reporting information is sent by using this method in another scenario.

With reference to FIG. 5, the foregoing describes a specific example in which after the terminal device receives the first information, when the foregoing limited condition is met, the terminal device may send, by default, the related information of the plurality of beams in the multi-beam grouping-based reporting mode in Case 1, Case 2, or Case 3. In other words, the network device does not need to notify, by using explicit signaling, the terminal device whether to use the multi-beam grouping-based reporting mode to report the information. When determining that the condition is met, the terminal device may use the multi-beam grouping-based reporting mode to report the information. Optionally, during actual application, in this embodiment of this application, the network device may alternatively send explicit signaling to notify the terminal device whether to send the reporting information based on the multi-beam grouping-based reporting mode in FIG. 5.

Specifically, based on FIG. 5, before step 520, the method may further include: The network device sends indication information to the terminal device, where the indication information is used to indicate that the multi-beam grouping-based reporting mode is in an on state, and that the multi-beam grouping-based reporting mode is in the on state indicates that the terminal device needs to report the related information of the at least two beams. The at least two beams are used to send reference signals carried on at least two reference signal resources, and the reference signals sent by using the at least two beams can be simultaneously received by the terminal device; and the at least two reference signal resources are respectively from the at least two reference signal resource groups.

Optionally, when the indication information indicates that the multi-beam grouping-based reporting mode is in the off state, the terminal device may not send, according to the foregoing specification, the information that needs to be reported. For example, the information reported by the terminal device may be related information corresponding to beams from a same TRP. For example, it is assumed that a difference between quality of beams from two TRPs to the terminal device is excessively large, and it is inappropriate to forcibly require data coordination. In this case, a network side device may indicate, by using the indication information, that the multi-beam grouping-based reporting mode is in the off state. In this case, the network device may schedule a plurality of beams of a same TRP to serve the UE. Correspondingly, during beam training, the terminal device may report related information of the plurality of beams of the same TRP.

The indication information may be configured by using the RRC signaling. Further, the indication information is sent to the terminal device by using reporting setting (reporting setting) information.

It should be noted that an example in which the terminal device sends the related information of the beams from the at least two reference signal groups is described above with reference to FIG. 5.

Alternatively, in a possible implementation (referred to as a multi-beam grouping-based reporting mode with a priority below), the terminal device may find no beam that meets both of the following two conditions: a condition 1: from two reference signal resource groups; and a condition 2: a plurality of beams that can be simultaneously received by the terminal device.

In this case, priorities of the two conditions may be set in this embodiment of this application. For example, information about a beam that meets the condition 1 is preferentially reported, or information about a beam that meets the condition 2 is preferentially reported. For example, the priority is that the condition 2 takes precedence over the condition 1. To be specific, if there is no beam combination that meets both the condition 2 and the condition 1, the terminal device selects a beam combination that meets the condition 2 for reporting.

The priority may be configured by the network device for the terminal device as configuration information, and the configuration information may be delivered to the terminal device by using RRC, a MAC-CE, or DC. For example, the network device configures, by using the RRC signaling, indication information indicating that a multi-beam grouping-based reporting mode with a priority is enabled, and then may deliver the priority configuration information by using the DCI. In this way, corresponding beam reporting information can be flexibly obtained based on a subsequent data scheduling requirement. During actual application, if the network device has a relatively urgent requirement for multi-beam transmission, the priority of the condition 2 may be set to be higher than that of the condition 1. In this case, when the terminal device can find no beam that meets both the condition 1 and the condition 2, a beam that meets the condition 2 is selected for reporting. Because the network device knows a reference signal resource group to which each beam identifier (or a corresponding reference signal resource) belongs, the network device may also learn, based on a reported beam ID, whether the plurality of beams reported this time are from the same TRP. On the contrary, if the network device expects to learn of beam quality information of different TRPs as much as possible, the network device may set the priority of the condition 1 to be higher than that of the condition 2. In this case, the network device cannot assume that the plurality of beams obtained in this reporting can be simultaneously received by the terminal device.

Optionally, it is assumed that even if the UE finds a beam combination that meets both the condition 1 and the condition 2, an RSRP difference between the two beams is very large. In this case, during actual application, the beam combination may not be scheduled at all during downlink transmission. Therefore, in this embodiment of this application, an RSRP threshold may be further set. When an RSRP difference between beams in the beam combination is greater than the RSRP threshold, the terminal device considers that the beam combination does not meet an actual transmission requirement. In this case, even if the terminal device finds the beam combination that meets both the condition 1 and the condition 2, the terminal device does not report the beams, but selects a beam combination that meets the RSRP threshold and the condition with a higher priority for reporting.

It should be understood that the foregoing examples in FIG. 1 to FIG. 5 are merely intended to help a person skilled in the art understand the embodiments of this application, but are not intended to limit the embodiments of this application to specific values or specific scenarios illustrated. Definitely, a person skilled in the art may make various equivalent modifications or changes based on the examples shown in FIG. 1 to FIG. 5. For example, a person skilled in the art may combine and split a plurality of embodiments based on the examples shown in FIG. 1 to FIG. 5. Such modifications or changes in the embodiments of this application also fall within the scope of the embodiments of this application.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The foregoing describes in detail the method in the embodiments of this application with reference to FIG. 1 to FIG. 5, and the following describes communications apparatuses in the embodiments of this application with reference to FIG. 6 to FIG. 9.

Figure 6:
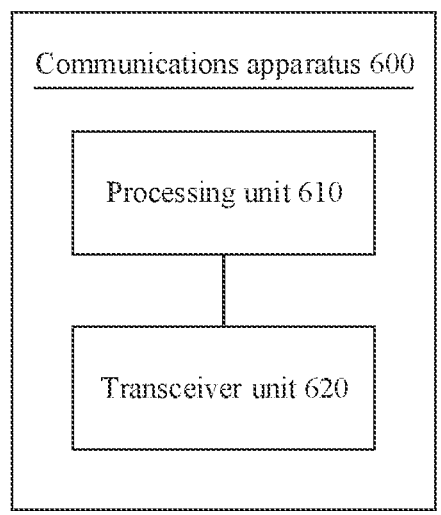
FIG. 6 is a schematic block diagram of a communications apparatus according to this application.

FIG. 6 is a schematic structural diagram of a communications apparatus according to an embodiment of this application. The communications apparatus 600 may include:

a processing unit 610 and a transceiver unit 620.

Specifically, the processing unit is configured to control the transceiver unit to receive first information, where the first information is used to configure at least two reference signal resource groups; and send reporting information, where the reporting information includes related information of at least two beams, the at least two beams are used to send reference signals carried on at least two reference signal resources, and the reference signals sent by using the at least two beams can be simultaneously received by the communications apparatus, where the at least two reference signal resources are respectively from the at least two reference signal resource groups.

In this embodiment of this application, related information of at least one beam is reported for each reference signal resource group, so that a transmit beam of a network device corresponding to the reference signal resource group can be trained. Therefore, in this embodiment of this application, downlink beams of a plurality of network devices in joint transmission can be trained through one time of scanning.

Optionally, the reference signal resource group is a reference signal resource set, and the at least two reference signal resource groups are configured by directly configuring, activating, or triggering at least two reference signal resource sets based on the first information.

Optionally, the first information includes quasi co-location QCL configuration information of reference signal resources in a same reference signal resource set, and reference signal resources with same QCL configuration information are configured as a same reference signal resource group.

Optionally, the QCL configuration information is a transmission configuration indicator TC state identifier that is in a one-to-one correspondence with a reference signal resource.

Optionally, the first information is carried in one or more of the following signaling: radio resource control RRC signaling, a media access control control element MAC-CE, and downlink control information DCI.

Optionally, when the first information is carried in the RRC, the reference signal is sent in a periodic manner; or when the first information is carried in the MAC-CE, the reference signal is sent in a semi-persistent manner: or when the first instruction is carried in the DCI, the reference signal is sent in an aperiodic manner.

Optionally, the first information is resource setting information, and the resource setting information is used to configure the at least two reference signal resource groups by configuring identifier sequence numbers of reference signal resources in a same reference signal resource set.

Optionally, the processing unit is further configured to control the transceiver unit to receive indication information sent by a network device, where the indication information is used to indicate that a multi-beam grouping-based reporting mode is in an on state, and that the multi-beam grouping-based reporting mode is in the on state indicates that the terminal device needs to report the related information of the at least two beams.

The communications apparatus 600 provided in this application may correspond to a process performed by the terminal device in the foregoing method embodiment in FIG. 5. For functions of the units/modules in the communications apparatus, refer to the foregoing descriptions. Detailed descriptions are appropriately omitted herein.

It should be understood that the communications apparatus shown in FIG. 6 may be a terminal device, or may be a chip or an integrated circuit installed in a terminal device.

Figure 7:
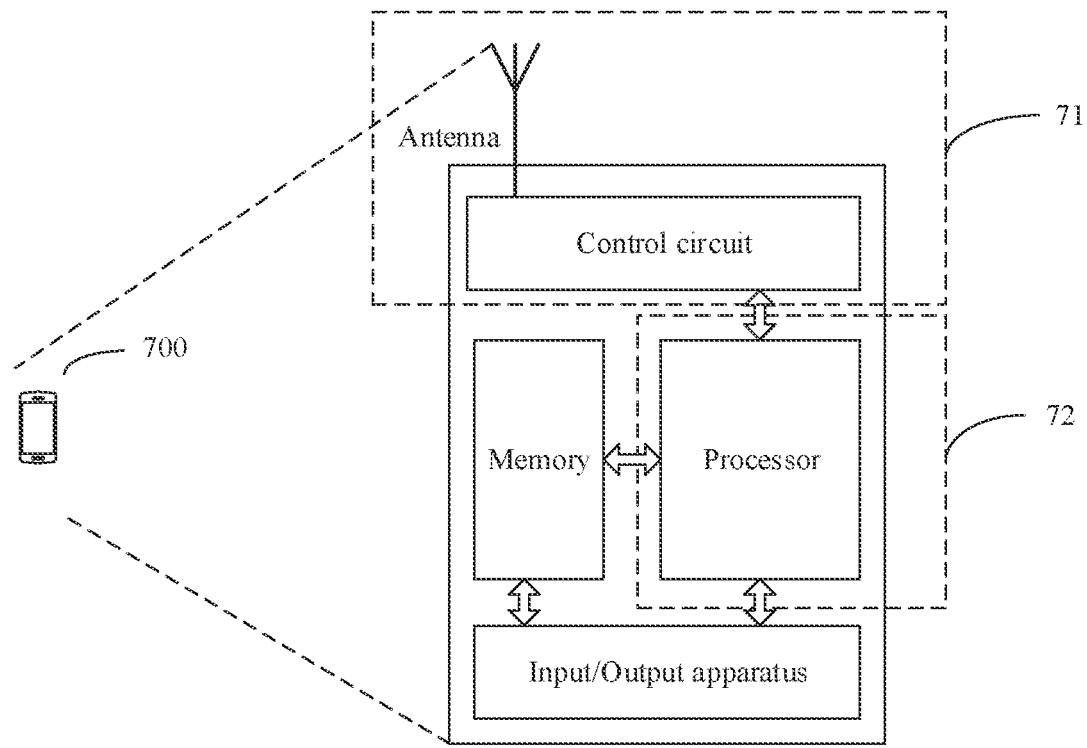
FIG. 7 is a schematic block diagram of a terminal device according to this application.

For example, the communications apparatus is a terminal device. FIG. 7 is a schematic structural diagram of a terminal device according to an embodiment of this application. For ease of understanding and ease of illustration, in FIG. 7, an example in which the terminal device is a mobile phone is used. FIG. 7 shows only main components of the terminal device. As shown in FIG. 7, the terminal device 700 includes a processor, a memory, a control circuit, and an antenna. Optionally, the terminal device may further include an input/output apparatus. It should be understood that, the control circuit may be disposed in the processor, or may be located outside the processor and exists independently. This is not limited in this embodiment of this application. The processor is mainly configured to: process a communication protocol and communication data, control the entire terminal device, execute a software program, and process data of the software program, for example, configured to support the terminal device in performing actions described in the foregoing method embodiment. The memory is mainly configured to store the software program and the data. The control circuit is mainly configured to: perform conversion between a baseband signal and a radio frequency signal, and process a radio frequency signal. A combination of the control circuit and the antenna may also be referred to as a transceiver that is mainly configured to receive/send a radio frequency signal in a form of an electromagnetic wave. The input/output apparatus, for example, a touchscreen, a display, or a keyboard, is mainly configured to receive data entered by a user and output data to the user.

After the terminal device is powered on, the processor may read a software program in a storage unit, explain and execute an instruction of the software program, and process data of the software program. When data needs to be sent wirelessly, after performing baseband processing on the to-be-sent data, the processor outputs a baseband signal to a radio frequency circuit, and the radio frequency circuit performs radio frequency processing on the baseband signal and then sends the radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description. FIG. 7 shows only one memory and one processor. An actual terminal device may have a plurality of processors and a plurality of memories. The memory may also be referred to as a storage medium, a storage device, or the like. This is not limited in this embodiment of this application. It should be understood that, the memory may be integrated into the processor, or may be located outside the processor and exists independently. This is not limited in this embodiment of this application.

In an optional implementation, the processor may include a baseband processor and a central processing unit. The baseband processor is mainly configured to process a communication protocol and communication data. The central processing unit is mainly configured to: control the entire terminal device, execute a software program, and process data of the software program. Functions of the baseband processor and the central processing unit may be integrated into the processor in FIG. 7. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In this embodiment of the present invention, an antenna and a control circuit that have a transceiver function may be considered as a transceiver unit 71 of the terminal device 700, for example, configured to support the terminal device in performing a transceiver function performed by the terminal device in the method implementations in FIG. 2 to FIG. 8. A processor having a processing function is considered as a processing unit 72 of the terminal device 700, and corresponds to the processing unit 610 in FIG. 6. As shown in FIG. 7, the terminal device 700 includes the transceiver unit 71 and the processing unit 72. The transceiver unit may also be referred to as a transceiver, a transceiver machine, a transceiver apparatus, or the like. The transceiver unit corresponds to the transceiver unit 620 in FIG. 6. Optionally, a component that is in the transceiver unit 71 and that is configured to implement a receiving function may be considered as a receiving unit, and a component that is in the transceiver unit 71 and that is configured to implement a sending function may be considered as a sending unit. In other words, the transceiver unit 71 includes the receiving unit and the sending unit, and the receiving unit may also be referred to as a receiver, an input port, a receiving circuit, or the like. The sending unit may be referred to as a transmitter machine, a transmitter, a transmitting circuit, or the like.

The processing unit 72 may be configured to execute the instruction stored in the memory, to control the transceiver unit 71 to receive a signal and/or send a signal, to complete a function of the terminal device in the foregoing method embodiment. In an implementation, a function of the transceiver unit 71 may be implemented by using a transceiver circuit or a dedicated transceiver chip.

It should be understood that the terminal device 700 shown in FIG. 7 can implement processes related to the terminal device in the method embodiment in FIG. 5. The operations and/or the functions of the modules in the terminal device 700 are intended to implement corresponding procedures in the foregoing method embodiment. For details, refer to the descriptions in the foregoing method embodiment. To avoid repetition, detailed descriptions are appropriately omitted herein.

Figure 8:
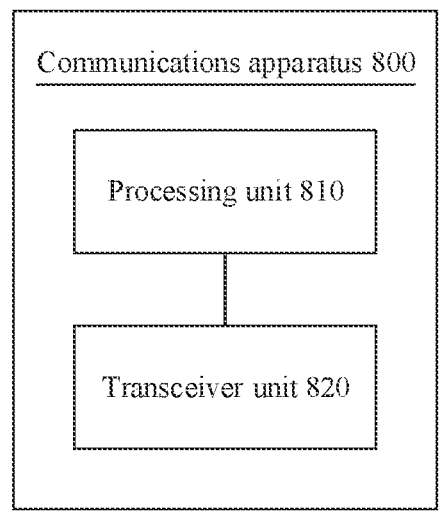
FIG. 8 is a schematic block diagram of another communications apparatus according to this application.

FIG. 8 is a schematic structural diagram of a communications apparatus according to an embodiment of this application. The apparatus 800 may include.

a processing unit 810 and a transceiver unit 820.

Specifically, the processing unit is configured to control the transceiver unit to send first information, where the first information is used to configure at least two reference signal resource groups; and receive reporting information sent by a terminal device, where the reporting information includes related information of at least two beams, the at least two beams are used to send reference signals carried on at least two reference signal resources, and the reference signals sent by using the at least two beams can be simultaneously received by the terminal device, where the at least two reference signal resources are respectively from the at least two reference signal resource groups.

In this embodiment of this application, related information of at least one beam is reported for each reference signal resource group, so that a transmit beam of a network device corresponding to the reference signal resource group can be trained. Therefore, in this embodiment of this application, downlink beams of a plurality of network devices in joint transmission can be trained through one time of scanning.

Optionally, the reference signal resource group is a reference signal resource set, and the at least two reference signal resource groups are configured by directly configuring, activating, or triggering at least two reference signal resource sets based on the first information.

Optionally, the first information includes quasi co-location QCL configuration information of reference signal resources in a same reference signal resource set, and reference signal resources with same QCL configuration information are configured as a same reference signal resource group.

Optionally, the QCL configuration information is a transmission configuration indicator TCI state identifier that is in a one-to-one correspondence with a reference signal resource.

Optionally, the first information is carried in one or more of the following signaling:

radio resource control RRC signaling, a media access control control element MAC-CE, and downlink control information DCI.

Optionally, when the first information is carried in the RRC, the reference signal is sent in a periodic manner; or when the first information is carried in the MAC-CE, the reference signal is sent in a semi-persistent manner; or when the first instruction is carried in the DCI, the reference signal is sent in an aperiodic manner.

Optionally, the first information is resource setting information, and the resource setting information is used to configure the at least two reference signal resource groups by configuring identifier sequence numbers of reference signal resources in a same reference signal resource set.

Optionally, the processing unit is further configured to control the transceiver unit to send indication information to the terminal device, where the indication information is used to indicate that a multi-beam reporting mode is in an on state, and that the multi-beam reporting mode is in the on state indicates that the terminal device needs to report the related information of the at least two beams.

The communications apparatus 800 provided in this application may correspond to a process performed by the network device in the method embodiment in FIG. 5. For functions of the units/modules in the communications apparatus, refer to the foregoing descriptions. Detailed descriptions are appropriately omitted herein.

It should be understood that the communications apparatus shown in FIG. 8 may be a network side device, or may be a chip or an integrated circuit installed in a network side device.

It should be understood that the network side device may represent any network device that communicates with the terminal device, or may represent an entirety including a plurality of network devices that communicate with the terminal device. This embodiment of this application is not limited thereto.

Figure 9:
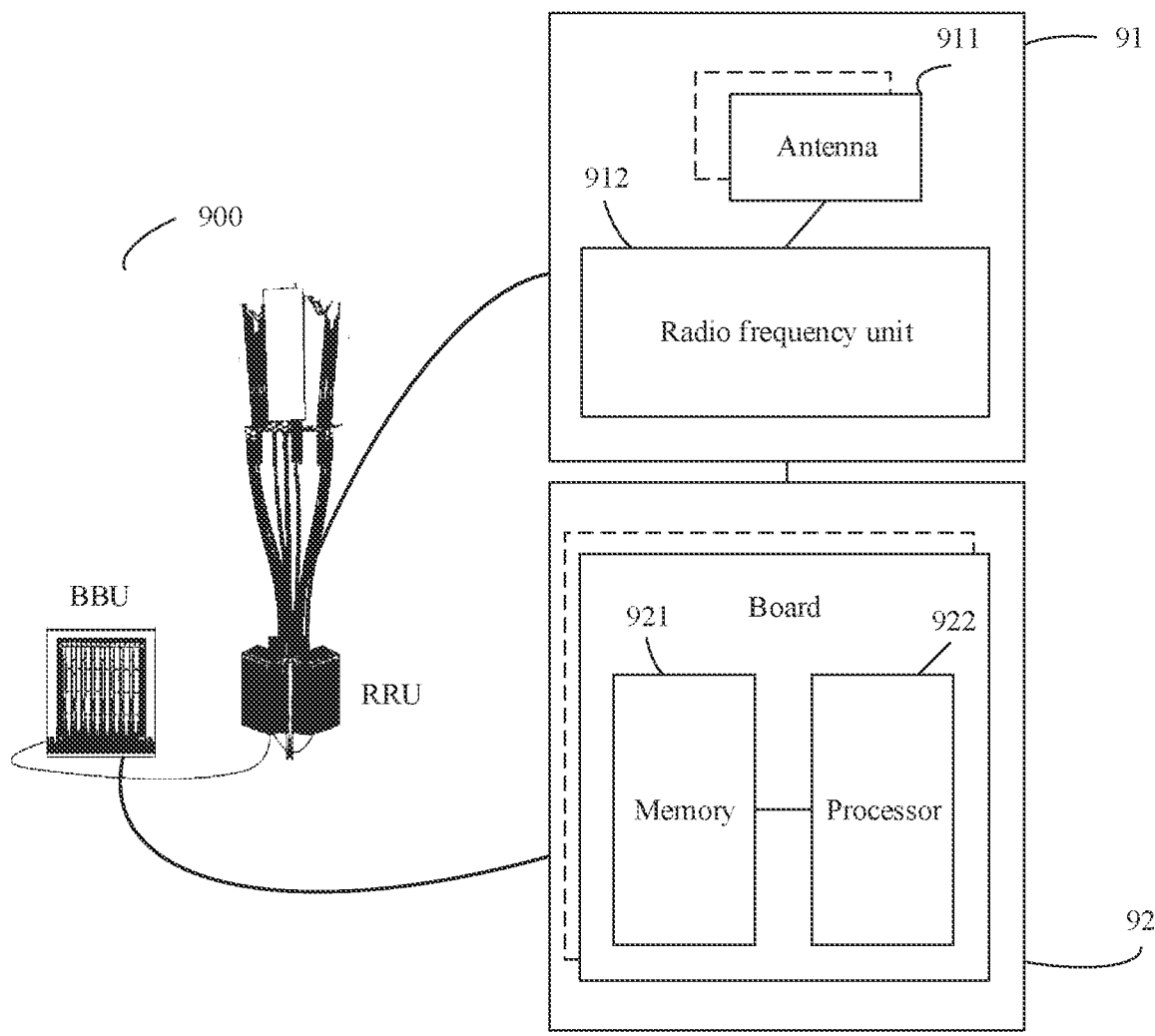
FIG. 9 is a schematic block diagram of a network device according to this application.

For example, the communications apparatus is a network device that communicates with the terminal device. FIG. 9 is a schematic structural diagram of a network device according to an embodiment of this application, for example, may be a schematic structural diagram of a base station. As shown in FIG. 9, the network device 900 may be applied to the system shown in FIG. 1, to perform functions of the network device in the foregoing method embodiment. The network device 900 may include one or more radio frequency units, such as a remote radio unit (remote radio unit, RRU) 91 and one or more baseband units (baseband unit, BBU) (which may also be referred to as a digital unit, digital unit, DU) 92. The RRU 91 may be referred to as a transceiver unit 91, and corresponds to the transceiver unit 820 in FIG. 8. Optionally, the transceiver unit may also be referred to as a transceiver machine, a transceiver circuit, a transceiver, or the like, and may include at least one antenna 911 and a radio frequency unit 912. The RRU 91 is mainly configured to: send and receive a radio frequency signal and perform conversion between a radio frequency signal and a baseband signal, for example, configured to send precoding matrix information to the terminal device. The BBU 92 is mainly configured to: perform baseband processing, control the base station, and so on. The RRU 91 and the BBU 92 may be physically disposed together, or may be physically disposed separately, that is, a distributed base station.

The BBU 92 is a control center of the base station, may also be referred to as a processing unit 92, may correspond to the processing unit 810 in FIG. 8, and is mainly configured to complete a baseband processing function, such as channel coding, multiplexing, modulation, and spreading. For example, the BBU (the processing unit) may be configured to control the base station to perform an operation procedure related to the network device in the foregoing method embodiment.

In an example, the BBU 92 may include one or more boards, and a plurality of boards may jointly support a radio access network (for example, an LTE network) of a single access standard, or may separately support radio access networks of different access standards (for example, an LTE network, a 5G network, or another network). The BBU 92 further includes a memory 921 and a processor 922. The memory 921 is configured to store a necessary instruction and necessary data. The processor 922 is configured to control the base station to perform necessary actions. For example, the processor 922 is configured to control the base station to perform an operation procedure related to the network device in the foregoing method embodiment. It should be understood that, the memory may be integrated into the processor, or may be located outside the processor and exists independently. This is not limited in this embodiment of this application. The memory 921 and the processor 922 may serve one or more boards. In other words, a memory and a processor may be independently disposed on each board. Alternatively, a plurality of boards may share a same memory and a same processor. In addition, a necessary circuit may be further disposed on each board.

It should be understood that the network device 900 shown in FIG. 9 can implement processes related to the network device in the method embodiment in FIG. 5. The operations and/or the functions of the modules in the network device 900 are intended to implement corresponding procedures in the foregoing method embodiment. For details, refer to the descriptions in the foregoing method embodiment. To avoid repetition, detailed descriptions are appropriately omitted herein.

An embodiment of this application further provides a processing apparatus, including a processor and an interface. The processor is configured to perform the communication method in any one of the foregoing method embodiments.

It should be understood that the processing apparatus may be a chip. For example, the processing apparatus may be a field programmable gate array (Field-Programmable Gate Array, FPGA), an application-specific integrated chip (Application Specific Integrated Circuit, ASIC), a system on chip (System on Chip, SoC), a central processing unit (Central Processor Unit, CPU), a network processor (Network Processor, NP), a digital signal processing circuit (Digital Signal Processor, DSP), a micro controller unit (Micro Controller Unit, MCU), a programmable logic controller (Programmable Logic Device, PLD), or another integrated chip.

In an implementation process, the steps in the foregoing method may be completed by using a hardware integrated logic circuit in the processor or instructions in a form of software. The steps of the method disclosed with reference to the embodiments of this application may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in a memory, and the processor reads information in the memory and implements the steps in the foregoing method in combination with hardware of the processor. To avoid repetition, details are not described herein again.

It should be noted that the processor in the embodiments of this application may be an integrated circuit chip, and has a signal processing capability. In an implementation process, steps in the foregoing method embodiment can be implemented by using a hardware integrated logical circuit in the processor, or by using instructions in a form of software. The processor may be a general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, or the processor may be any conventional processor, or the like. The steps of the method disclosed with reference to the embodiments of this application may be directly performed and completed by a hardware decoding processor, or may be performed and completed by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in a memory, and the processor reads information in the memory and implements the steps in the foregoing method in combination with hardware of the processor.

It may be understood that the memory in the embodiments of this application may be a volatile memory or a non-volatile memory, or may include both a volatile memory and a non-volatile memory. The non-volatile memory may be a read-only memory (read-only memory, ROM), a programmable ROM (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. By way of example and not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM), and a direct rambus dynamic random access memory (direct Rambus RAM, DR RAM). It should be noted that the memory of the system and the method described in this specification includes but is not limited to these types of memories and any memory of another proper type.

An embodiment of this application further provides a communications system, including the foregoing network device and terminal device.

An embodiment of this application further provides a computer-readable medium. The computer-readable medium stores a computer program, and when the computer program is executed by a computer, the method in any one of the foregoing method embodiments is implemented.

An embodiment of this application further provides a computer program product. When the computer program product is executed by a computer, the method in any one of the foregoing method embodiments is implemented.

All or some of the foregoing embodiments may be implemented by using software, hardware, firmware, or any combination thereof. When software is used for implementation, all or some of the embodiments may be implemented in a form of computer program product. The computer program product includes one or more computer instructions. When the computer instructions are loaded and executed on the computer, all or some of the procedures or the functions according to the embodiments of this application are generated. The computer may be a general-purpose computer, a special-purpose computer, a computer network, or another programmable apparatus. The computer instructions may be stored in one computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disk, SSD)), or the like.

It should be understood that the foregoing describes a communication method used in downlink transmission in a communications system. However, this application is not limited thereto. Optionally, a solution similar to the foregoing solution may also be used in uplink transmission. To avoid repetition, details are not described herein.

The network device and the terminal device in the foregoing apparatus embodiments completely correspond to the network device and the terminal device in the method embodiments. A corresponding module or unit performs a corresponding step. For example, the sending module (transmitter) performs a sending step in the method embodiment, the receiving module (receiver) performs a receiving step in the method embodiment, and another step other than the sending step and the receiving step may be performed by the processing module (processor). For a function of a specific module, refer to the corresponding method embodiment. The sending module and the receiving module may form a transceiver module, and the transmitter and the receiver may form a transceiver, to jointly implement receiving and sending functions. There may be one or more processors.

In this application, "at least one" means one or more, and "a plurality of" means at least two. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between associated objects. "At least one of the following" or a similar expression thereof indicates any combination of the following, and includes any combination of one or more of the following. For example, at least one of a, b, or c may indicate: a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the entire specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and the components may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system, a distributed system, and/or across a network such as the Internet interacting with other systems by using the signal).

It should be further understood that "first", "second", "third", "fourth", and various numbers included in this specification are merely distinguished for convenient description, and are not intended to limit the scope of the embodiments of this application.

It should be understood that the term "and/or" in this specification describes only an association relationship between associated objects and indicate that three relationships may exist. For example, A and/or B may indicate the following three cases: Only A exists, both A and B exist, and only B exists.

A person of ordinary skill in the art may be aware that illustrative logical blocks (illustrative logical block) and steps (step) described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used for implementation, all or some of the embodiments may be implemented in a form of computer program product. The computer program product includes one or more computer instructions (programs). When the computer program instructions (programs) are loaded and executed on a computer, all or some of the procedures or the functions according to the embodiments of this application are generated. The computer may be a general-purpose computer, a special-purpose computer, a computer network, or another programmable apparatus. The computer instructions may be stored in one computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A beam reporting method, comprising:
    receiving, by a terminal device, first information, wherein the first information configures at least two reference signal resource groups; and
    sending, by the terminal device, reporting information, wherein the reporting information comprises related information of at least two beams, the at least two beams are used to send reference signals carried on at least two reference signal resources, and the reference signals sent by using the at least two beams are simultaneously received by the terminal device, wherein
    the at least two reference signal resources are respectively from the at least two reference signal resource groups.

2. The method according to claim 1, wherein before the sending, by the terminal device, reporting information, the method further comprises:
    receiving, by the terminal device, indication information sent by a network device, wherein the indication information indicates that a multi-beam grouping-based reporting mode is in an on state, and that the multi-beam grouping-based reporting mode is in the on state indicates that the terminal device needs to report the related information of the at least two beams.

3. The method according to claim 1, wherein a reference signal resource group is a reference signal resource set, and the at least two reference signal resource groups are configured by directly configuring, activating, or triggering at least two reference signal resource sets based on the first information.

4. The method according to claim 1, wherein
    the first information comprises quasi co-location (QCL) configuration information of reference signal resources in a same reference signal resource set, and reference signal resources with same QCL configuration information are configured as a same reference signal resource group.

5. The method according to claim 1, wherein
    the first information is carried in one or more of the following signaling:
    radio resource control (RRC) signaling, a media access control control element (MAC-CE), and downlink control information (DCI).

6. The method according to claim 1, wherein
    the first information is resource setting information, and the resource setting information configures the at least two reference signal resource groups by configuring identifier sequence numbers of reference signal resources in a same reference signal resource set.

7. A communications apparatus, comprising at least one processor, and one or more memories coupled to the at least one processor and storing programming instructions for execution by the at least one processor to cause the apparatus to implement:
    receiving first information, wherein the first information configures at least two reference signal resource groups; and
    sending reporting information, wherein the reporting information comprises related information of at least two beams, the at least two beams are used to send reference signals carried on at least two reference signal resources, and the reference signals sent by using the at least two beams are simultaneously received by the communications apparatus, wherein
    the at least two reference signal resources are respectively from the at least two reference signal resource groups.

8. The communications apparatus according to claim 7, wherein the at least one processor, and the one or more memories coupled to the at least one processor and storing the programming instructions for the execution by the at least one processor to cause the apparatus to further implement:
    receiving indication information sent by a network device, wherein the indication information indicates that a multi-beam grouping-based reporting mode is in an on state, and that the multi-beam grouping-based reporting mode is in the on state indicates that a terminal device needs to report the related information of the at least two beams.

9. The communications apparatus according to claim 7, wherein a reference signal resource group is a reference signal resource set, and the at least two reference signal resource groups are configured by directly configuring, activating, or triggering at least two reference signal resource sets based on the first information.

10. The communications apparatus according to claim 7, wherein
    the first information comprises quasi co-location (QCL) configuration information of reference signal resources in a same reference signal resource set, and reference signal resources with same QCL configuration information are configured as a same reference signal resource group.

11. The communications apparatus according to claim 7, wherein
the first information is carried in one or more of the following signaling:
radio resource control RRC signaling, a media access control control element (MAC-CE), and downlink control information (DCI).

12. The communications apparatus according to claim 7, wherein
the first information is resource setting information, and the resource setting information configures the at least two reference signal resource groups by configuring identifier sequence numbers of reference signal resources in a same reference signal resource set.

13. The communications apparatus according to claim 7, wherein the communications apparatus is a terminal device.

14. A communications apparatus, comprising at least one processor, and one or more memories coupled to the at least one processor and storing programming instructions for execution by the at least one processor to cause the apparatus to implement:
sending first information, wherein the first information configures at least two reference signal resource groups; and
receiving reporting information sent by a terminal device, wherein the reporting information comprises related information of at least two beams, the at least two beams are used to send reference signals carried on at least two reference signal resources, and the reference signals sent by using the at least two beams are simultaneously received by the terminal device, wherein
the at least two reference signal resources are respectively from the at least two reference signal resource groups.

15. The communications apparatus according to claim 14, wherein the at least one processor, and the one or more memories coupled to the at least one processor and storing the programming instructions for the execution by the at least one processor to cause the apparatus to further implement:
sending indication information to the terminal device, wherein the indication information indicates that a multi-beam reporting mode is in an on state, and that the multi-beam reporting mode is in the on state indicates that the terminal device needs to report the related information of the at least two beams.

16. The communications apparatus according to claim 14, wherein a reference signal resource group is a reference signal resource set, and the at least two reference signal resource groups are configured by directly configuring, activating, or triggering at least two reference signal resource sets based on the first information.

17. The communications apparatus according to claim 14, wherein
the first information comprises quasi co-location (QCL) configuration information of reference signal resources in a same reference signal resource set, and reference signal resources with same QCL configuration information are configured as a same reference signal resource group.

18. The communications apparatus according to claim 14, wherein
the first information is carried in one or more of the following signaling:
radio resource control RRC signaling, a media access control control element (MAC-CE), and downlink control information (DCI).

19. The communications apparatus according to claim 14, wherein
the first information is resource setting information, and the resource setting information configures the at least two reference signal resource groups by configuring identifier sequence numbers of reference signal resources in a same reference signal resource set.

20. The communications apparatus according to claim 14, wherein the communications apparatus is a network device.

* * * * *